United States Patent [19]

Kuhn, II

[11] Patent Number: 4,796,341
[45] Date of Patent: Jan. 10, 1989

[54] PLATE ROUTING METHOD AND APPARATUS

[75] Inventor: James A. Kuhn, II, York, Pa.

[73] Assignee: FMC Corporation, Chicago, Ill.

[21] Appl. No.: 142,586

[22] Filed: Jan. 11, 1988

[51] Int. Cl.$^4$ ............... B23Q 7/00; B65G 47/24; B23C 9/00
[52] U.S. Cl. .................. 29/33 P; 29/563; 198/413; 409/132; 409/158; 409/160; 409/174
[58] Field of Search ............ 29/563, 558, 564, 33 P; 414/278; 198/413, 468.6, 349, 345, 722, 772, 781; 409/132, 131, 158, 159, 160, 164, 161, 219, 227, 172, 174, 218

[56] References Cited

U.S. PATENT DOCUMENTS

| | | | |
|---|---|---|---|
| 3,977,298 | 8/1976 | Linsinger | 409/161 X |
| 4,014,428 | 3/1977 | Ossbahr | 198/345 |
| 4,018,134 | 4/1977 | Linsinger | 409/161 X |
| 4,270,253 | 6/1981 | Herb et al. | 29/33 P |
| 4,408,560 | 10/1983 | Caratsch | 198/413 |
| 4,603,456 | 8/1986 | Hiroyasu et al. | 29/33 P |
| 4,610,595 | 9/1986 | Hockersmith | 198/468.6 X |
| 4,637,118 | 1/1987 | Sugiyama et al. | 29/563 |
| 4,679,286 | 7/1987 | Momoi et al. | 29/33 P |

FOREIGN PATENT DOCUMENTS

| | | | |
|---|---|---|---|
| 182012 | 10/1984 | Japan | 409/161 |
| 209862 | 9/1986 | Japan | 29/563 |
| 622645 | 9/1978 | U.S.S.R. | 29/33 P |
| 706233 | 1/1980 | U.S.S.R. | 29/563 |

Primary Examiner—William R. Briggs
Attorney, Agent, or Firm—A. J. Moore; H. M. Stanley; R. B. Megley

[57] ABSTRACT

A method and apparatus for routing a plurality of plates of predetermined size through at least one precision processing station for accurately and economically performing machining functions or the like on the plates. Aligned group of plates are presented to an input end of the apparatus by fork lift trucks and after processing the group of plates, the process plates are aligned, and removed from the apparatus by fork lift trucks or the like thereby greatly reducing labor costs and providing a more accurately machined product.

50 Claims, 12 Drawing Sheets

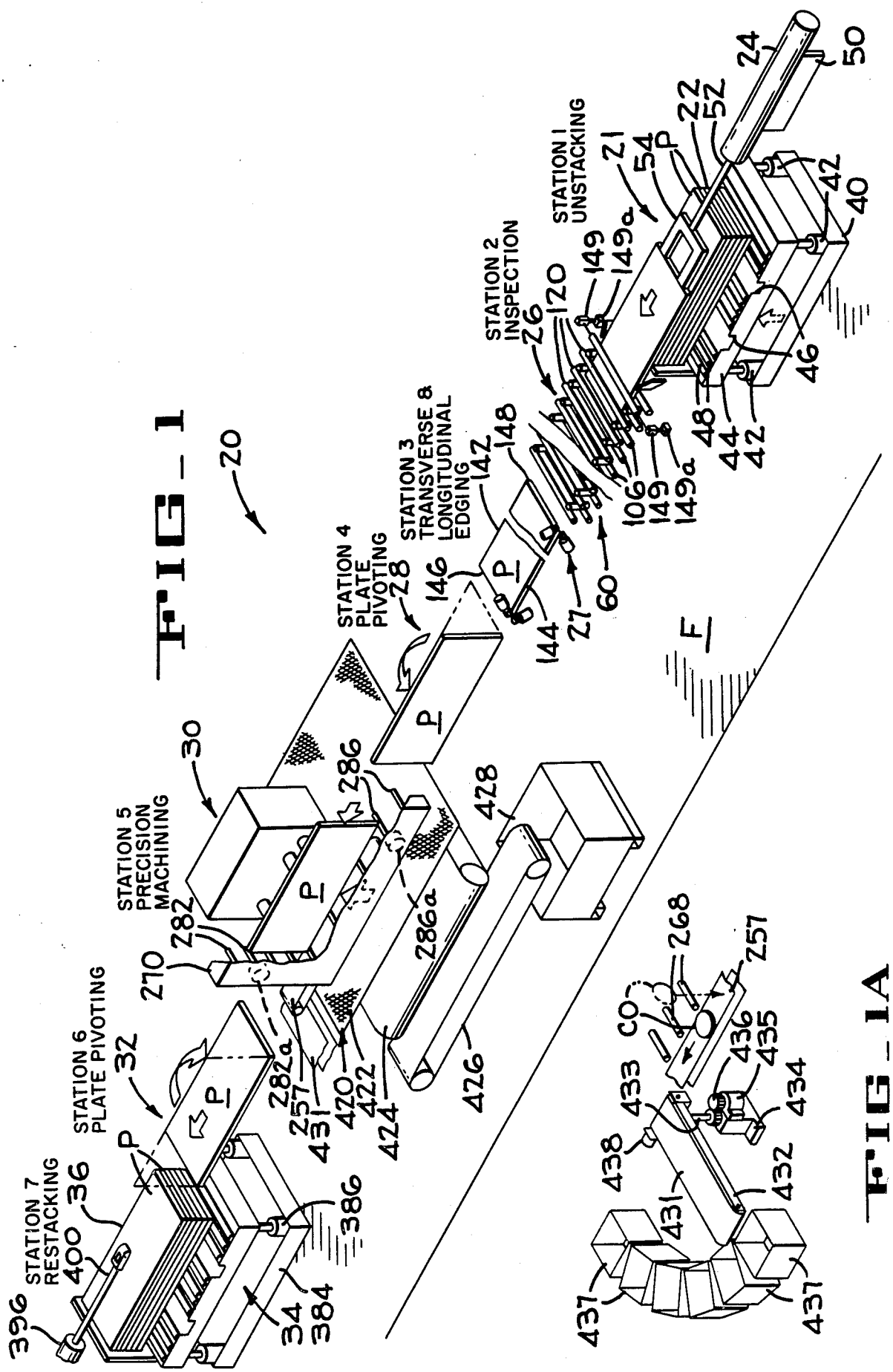

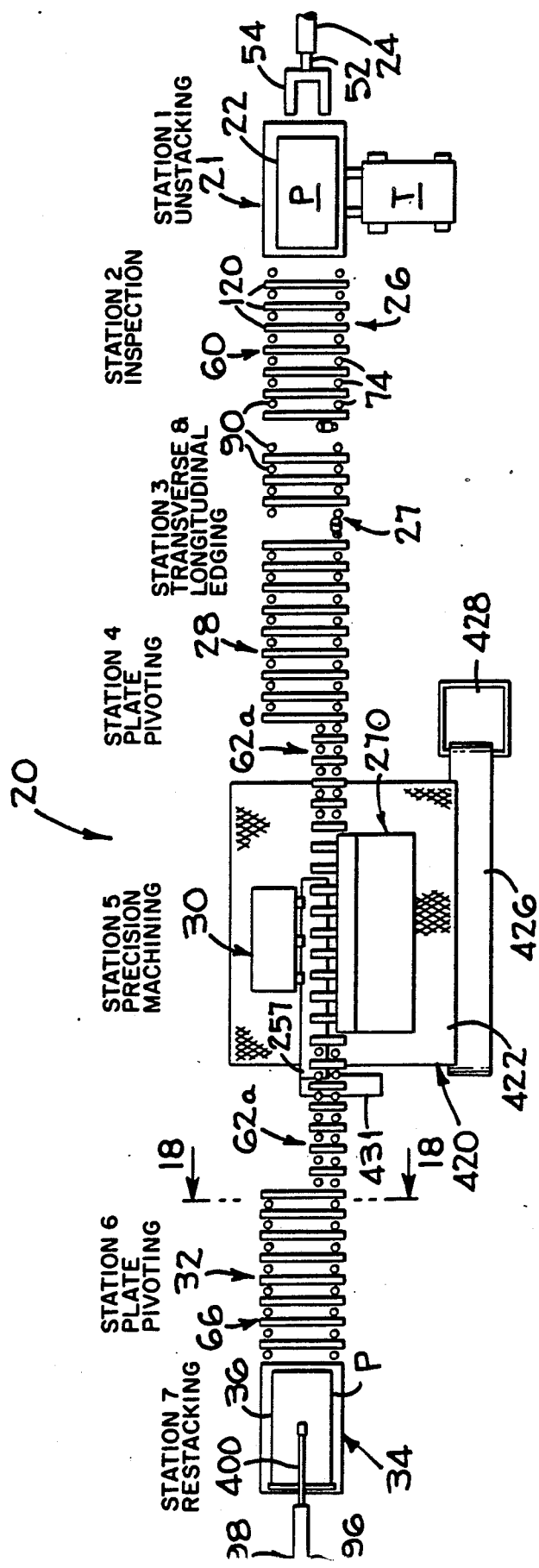

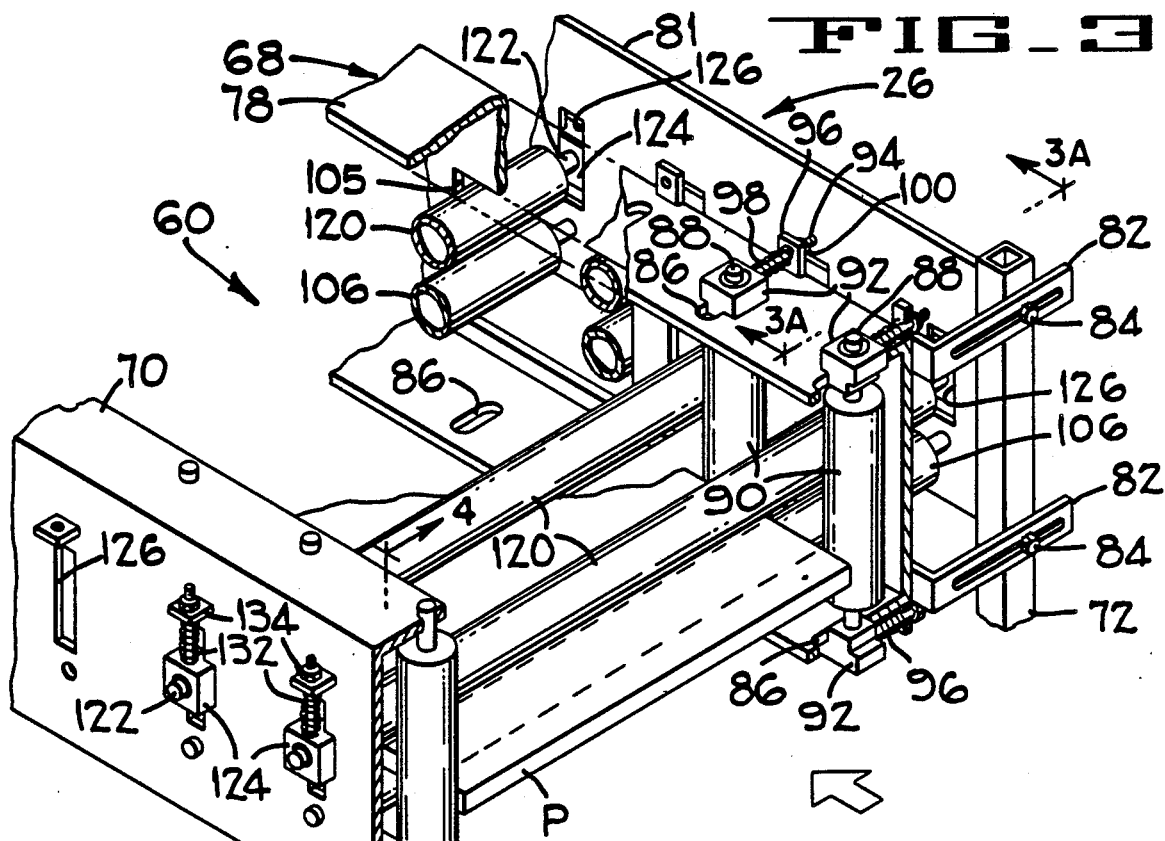
FIG_3
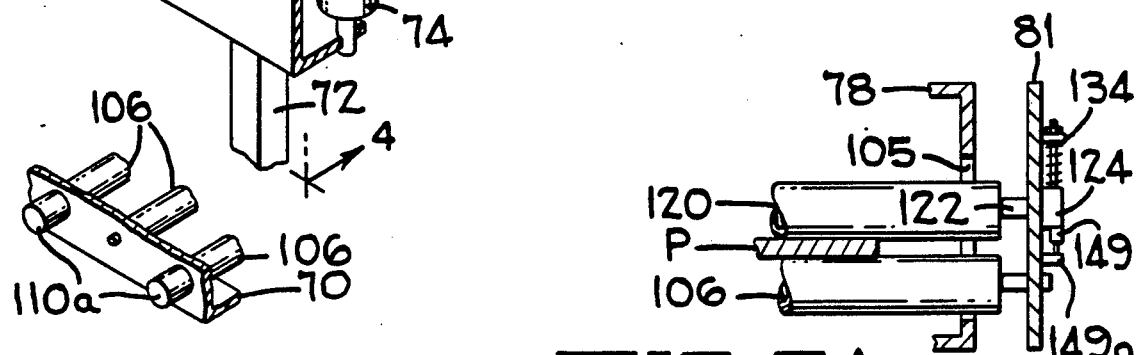
FIG_4A  FIG_3A
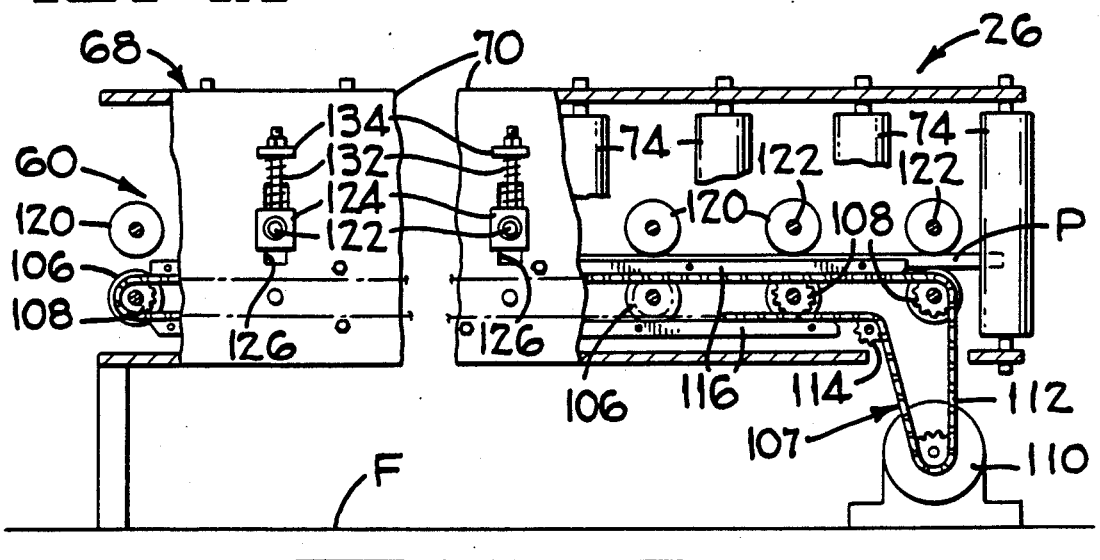

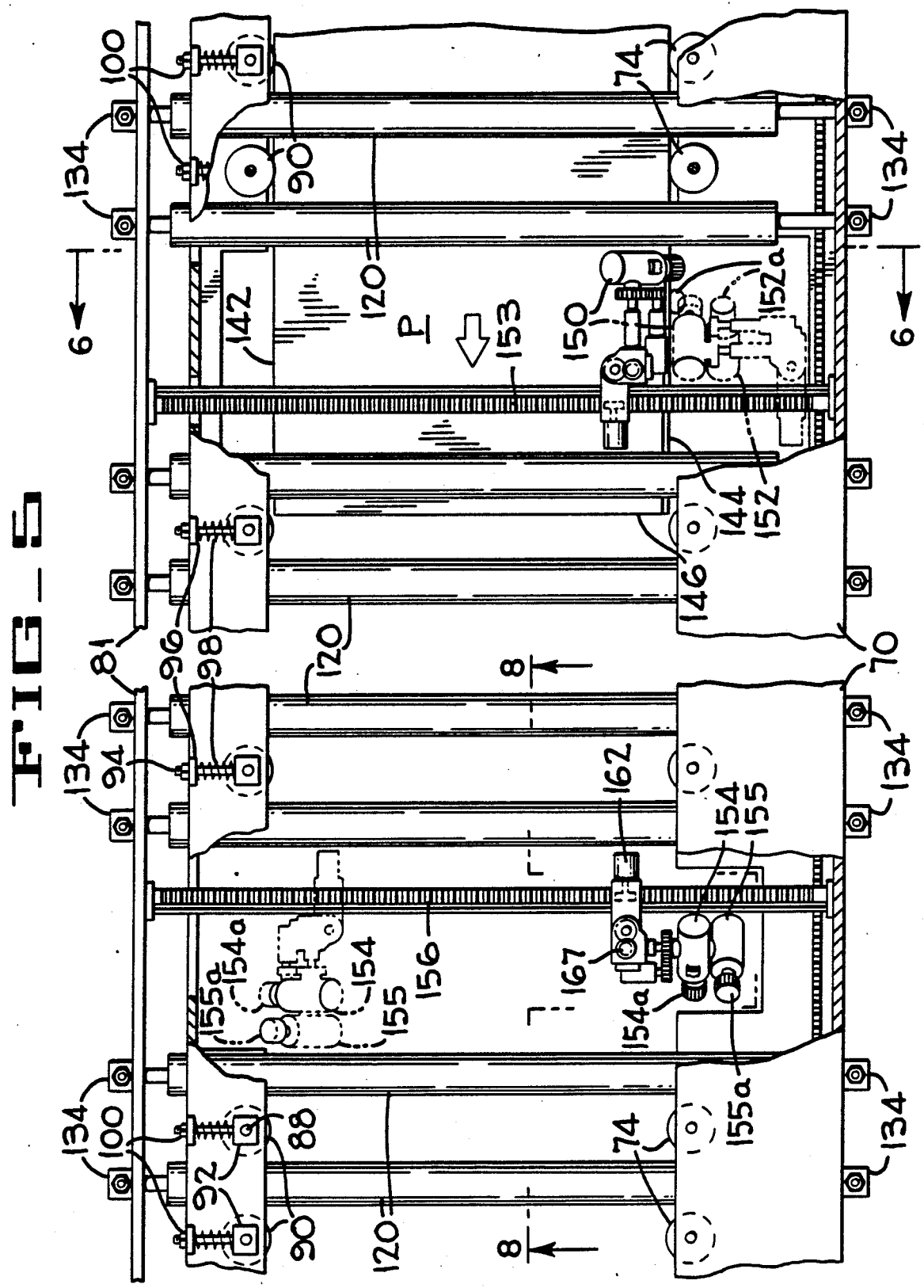

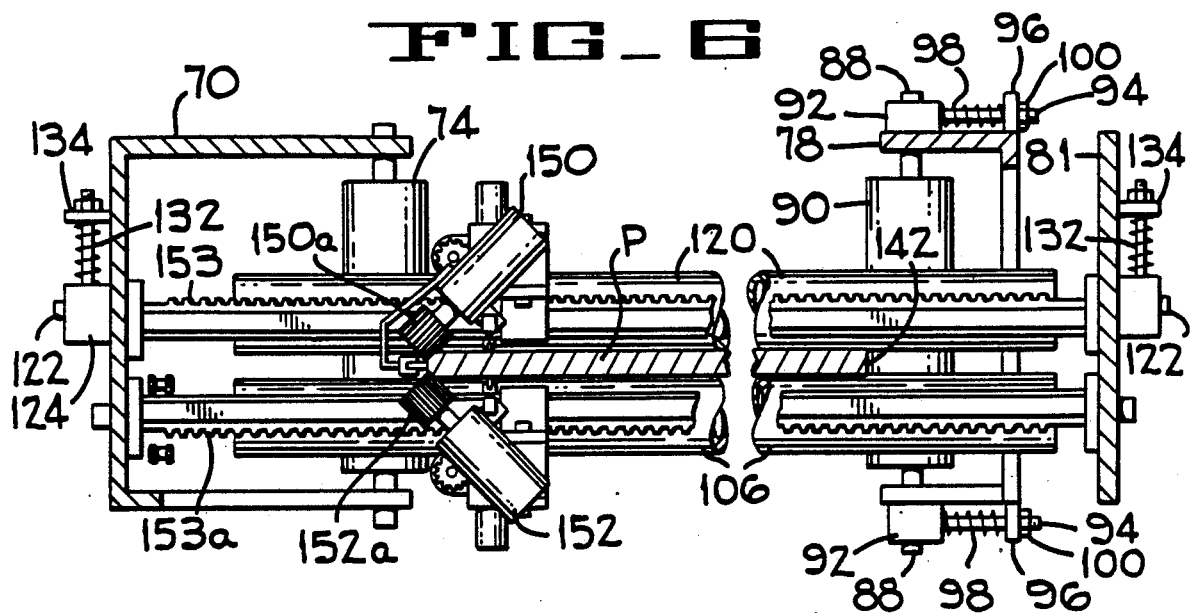
FIG_6
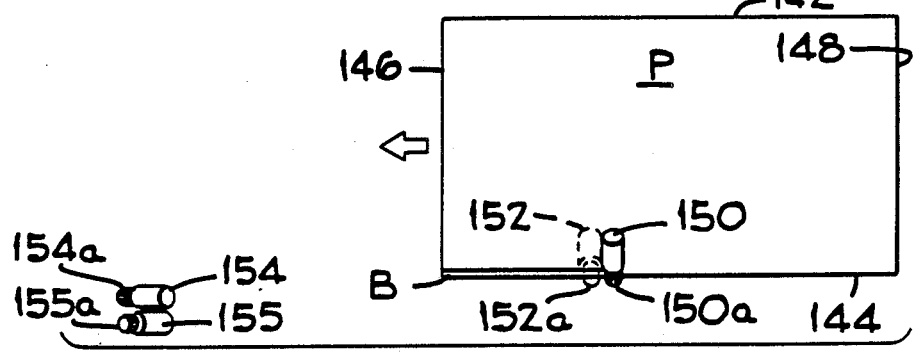
FIG_6A
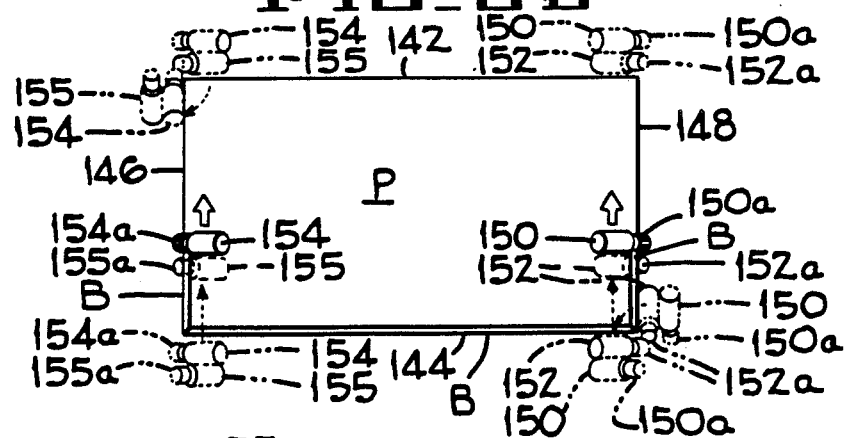
FIG_6B
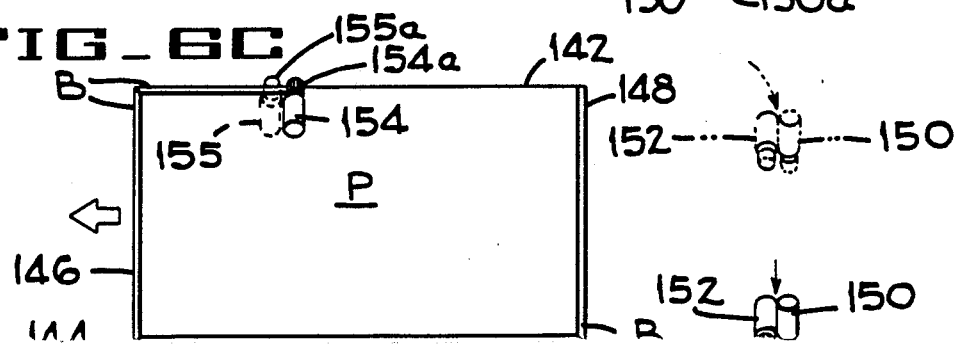
FIG_6C

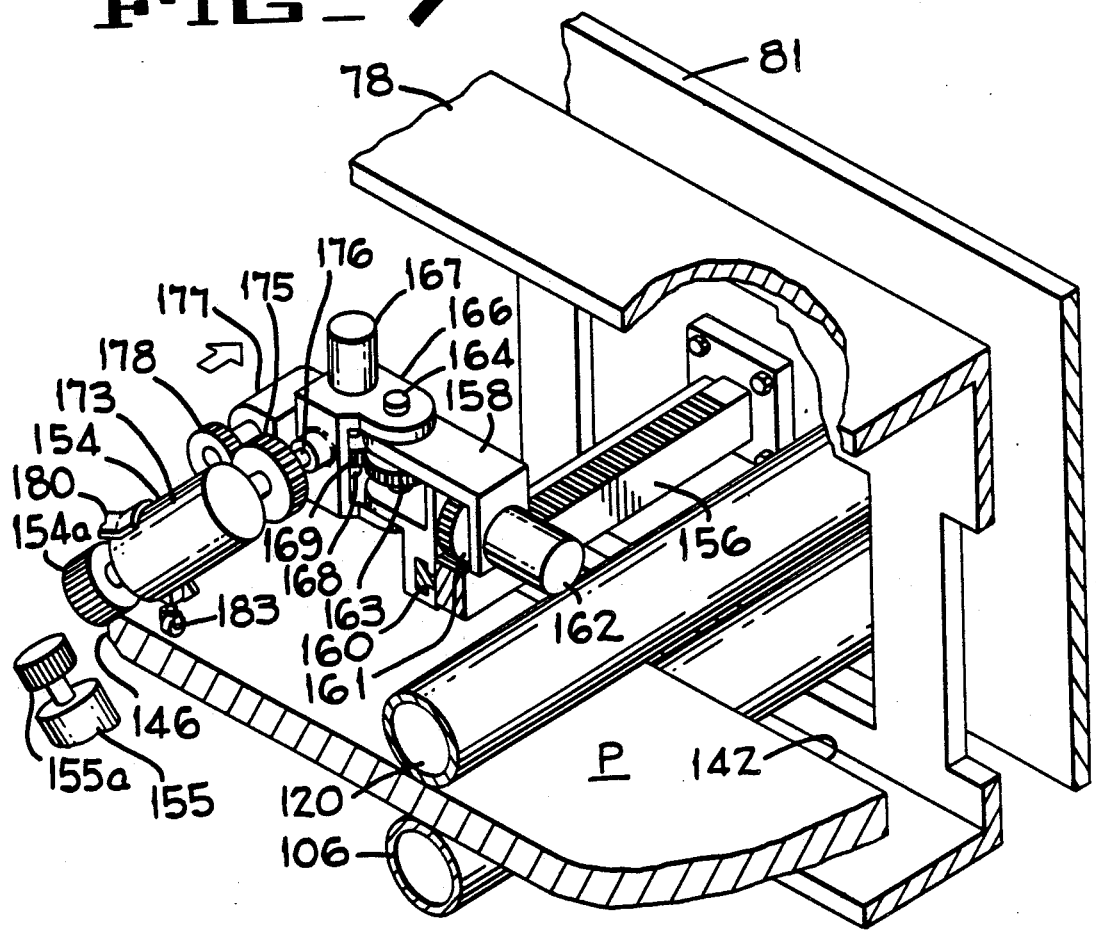
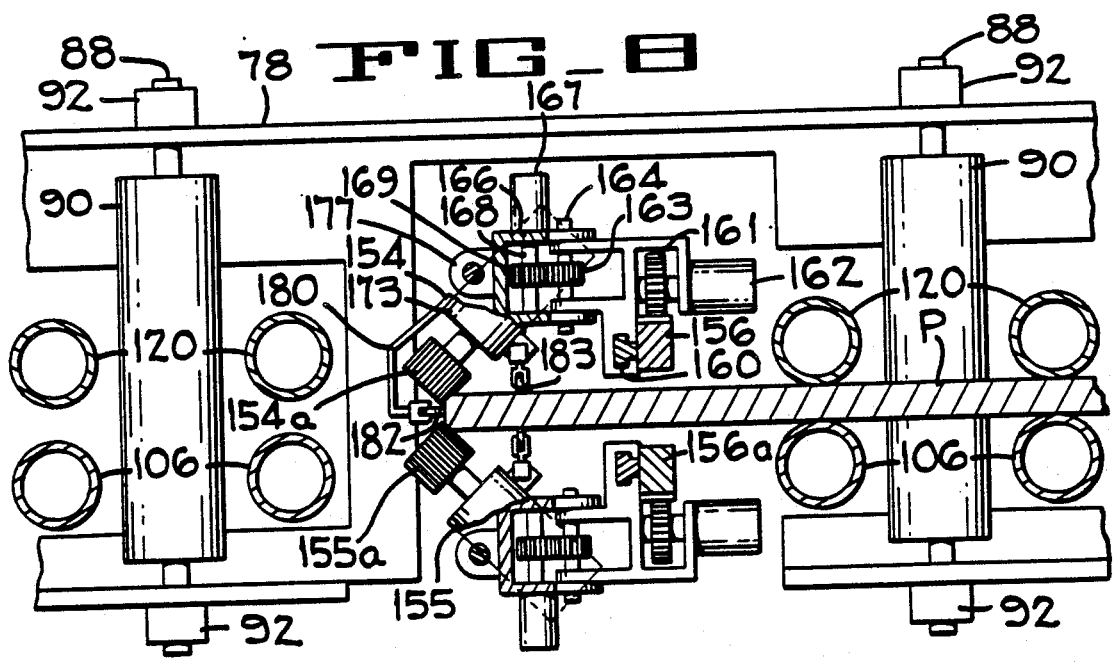

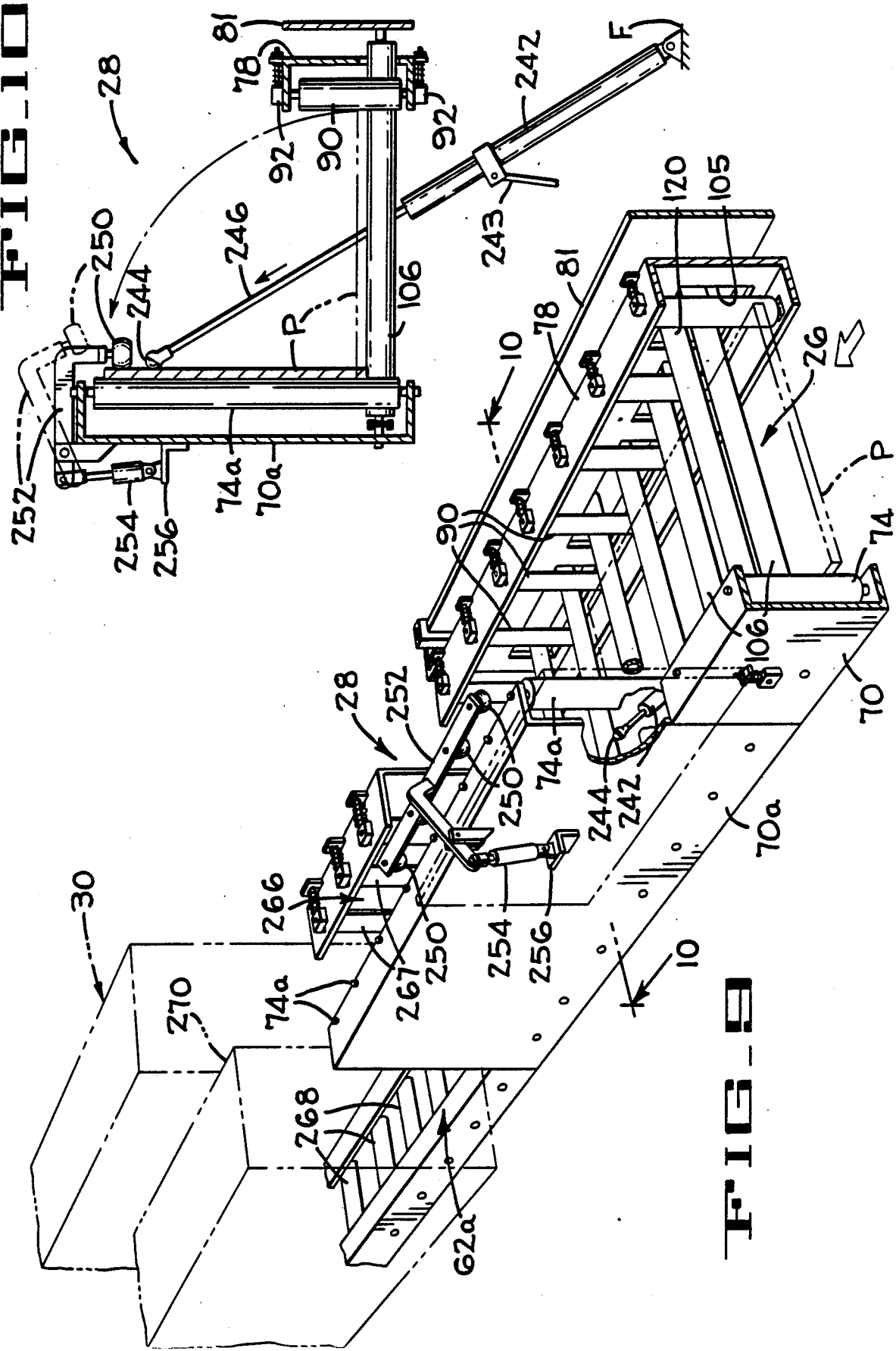

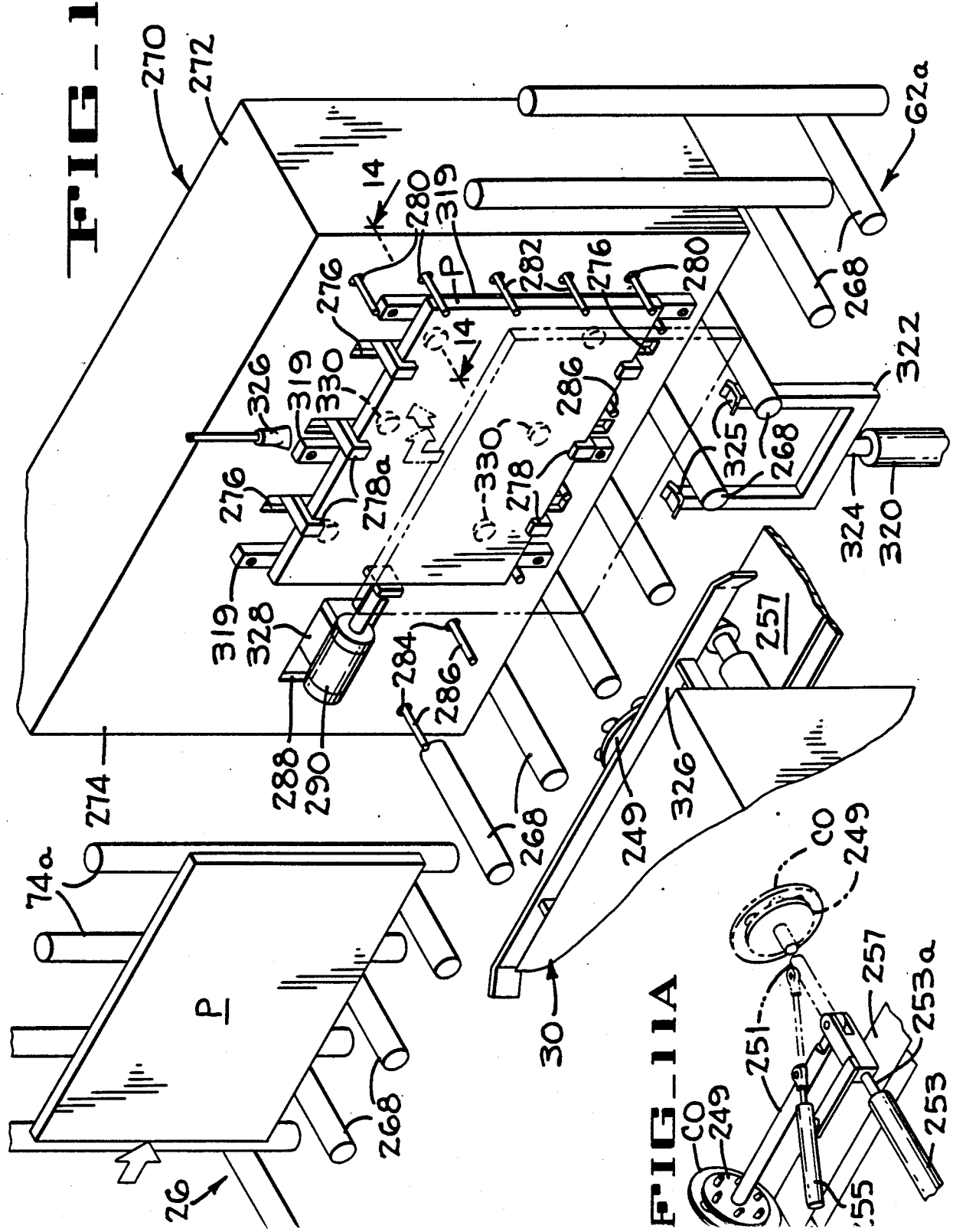

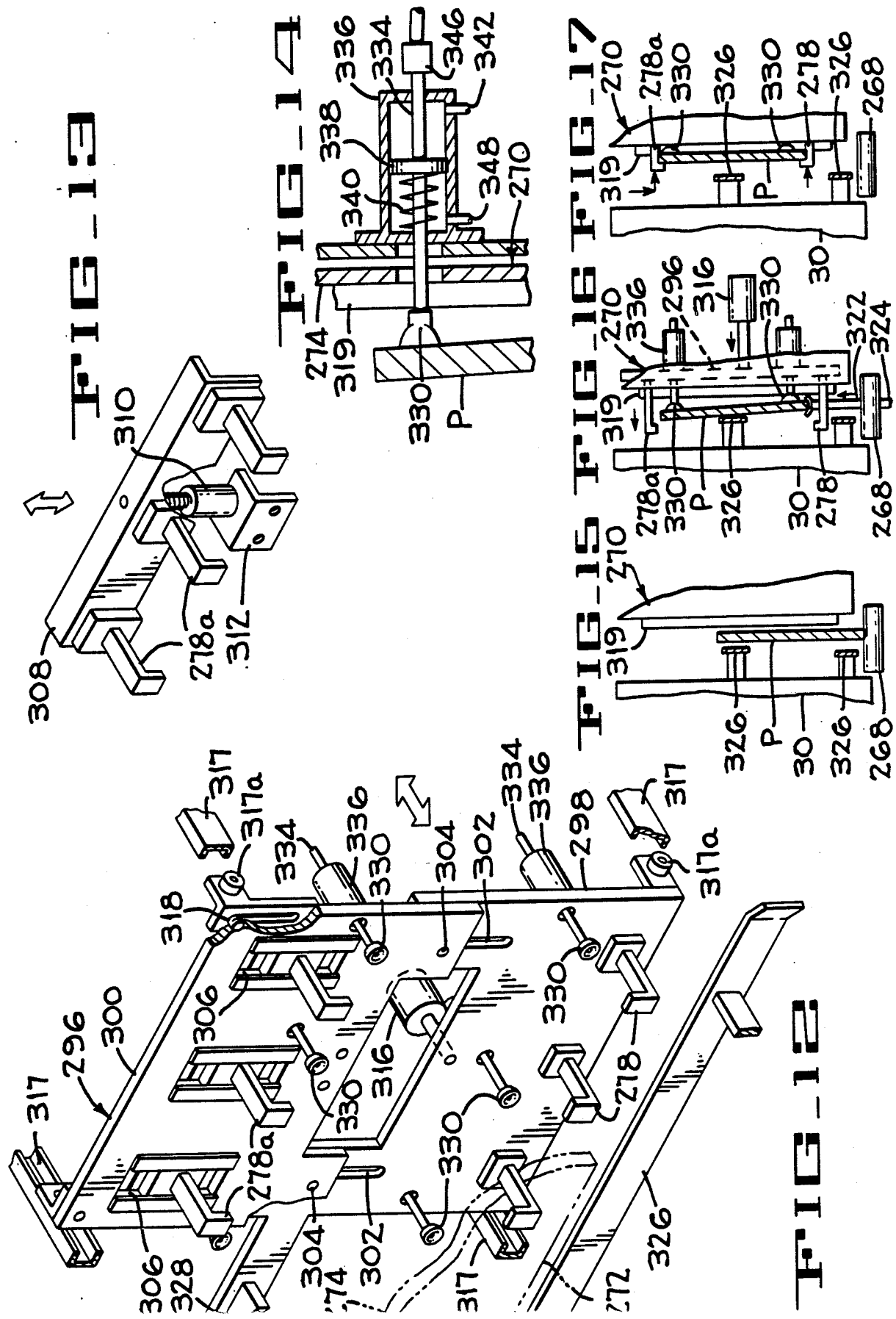

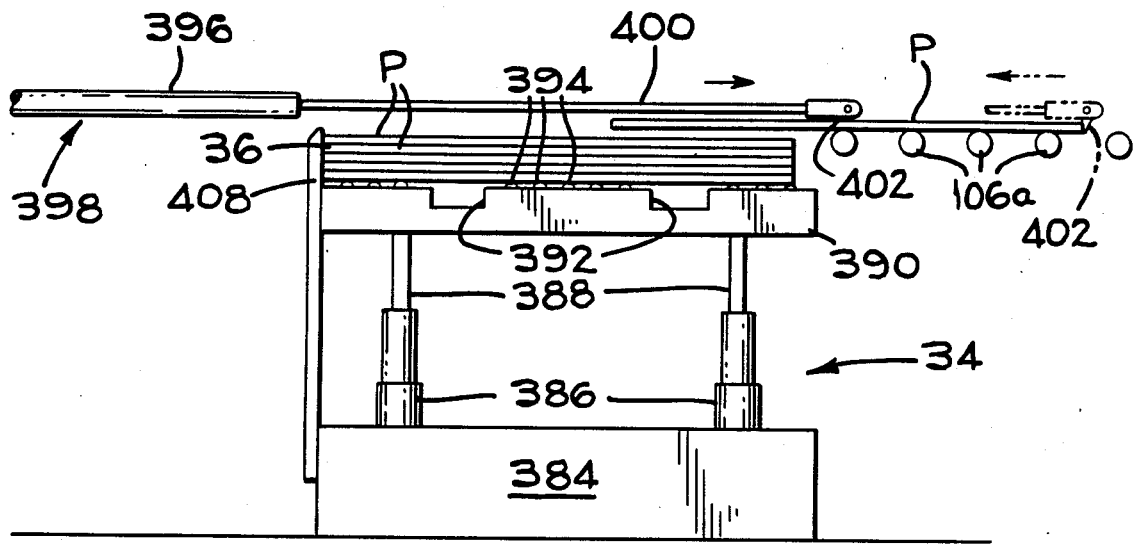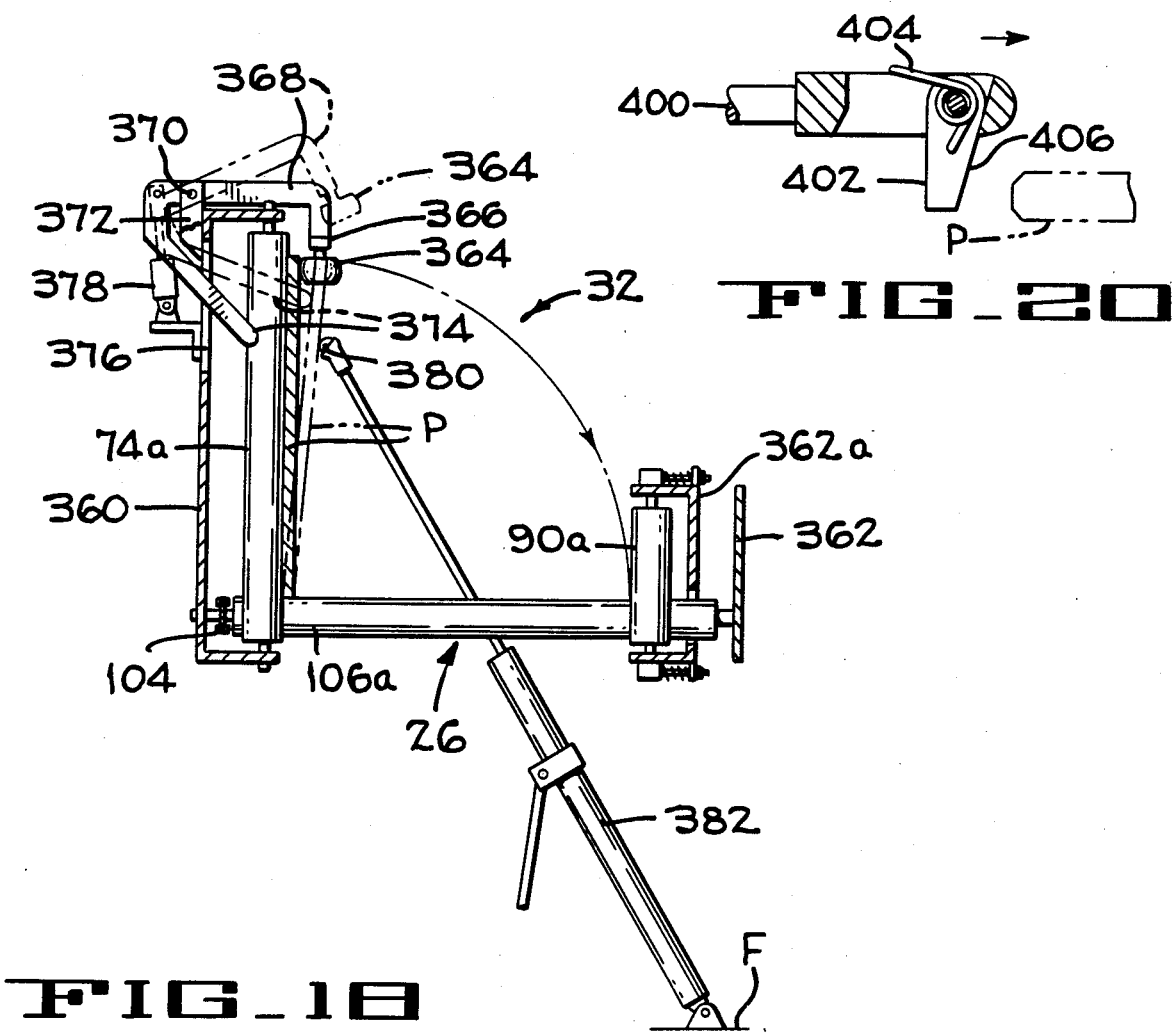

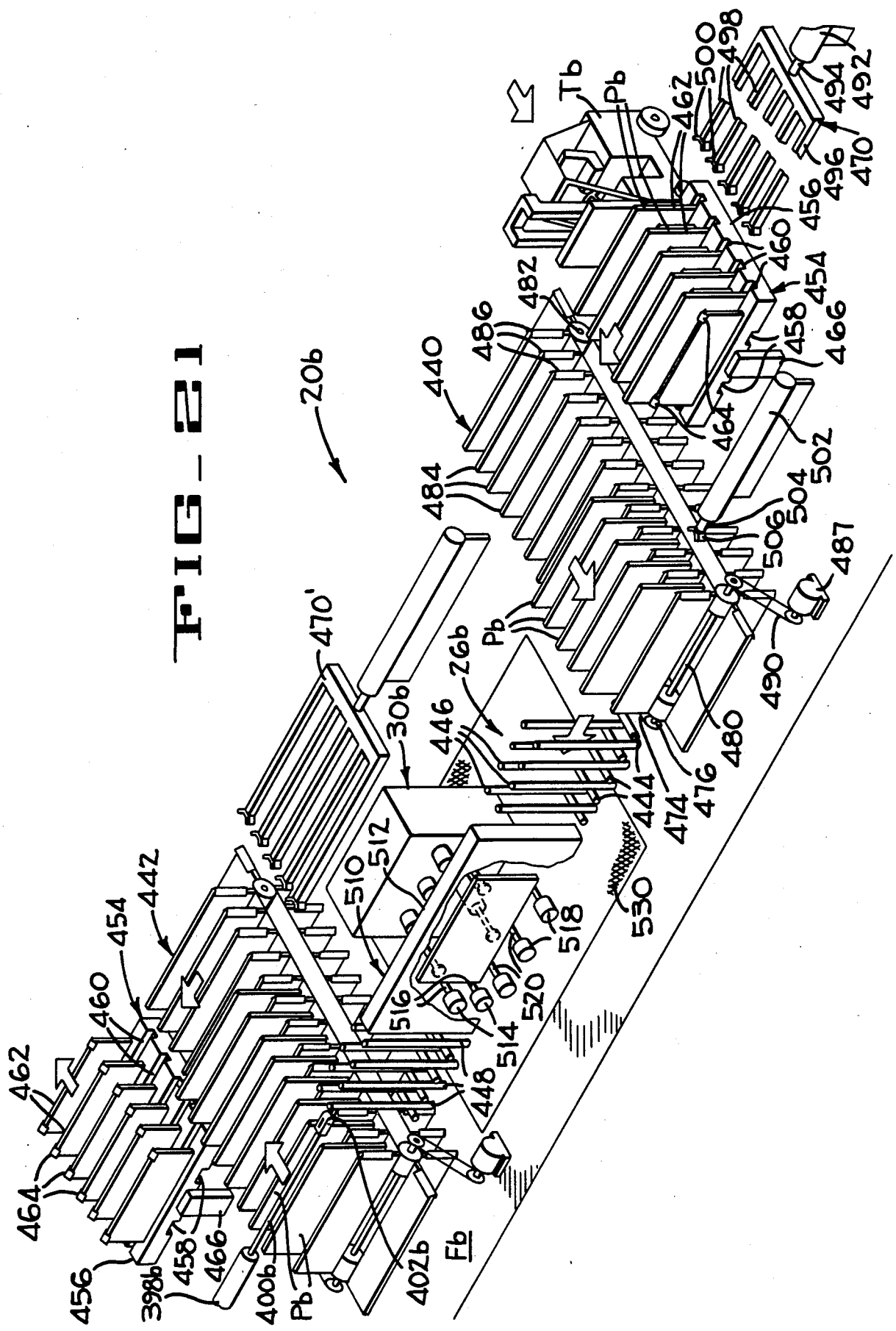

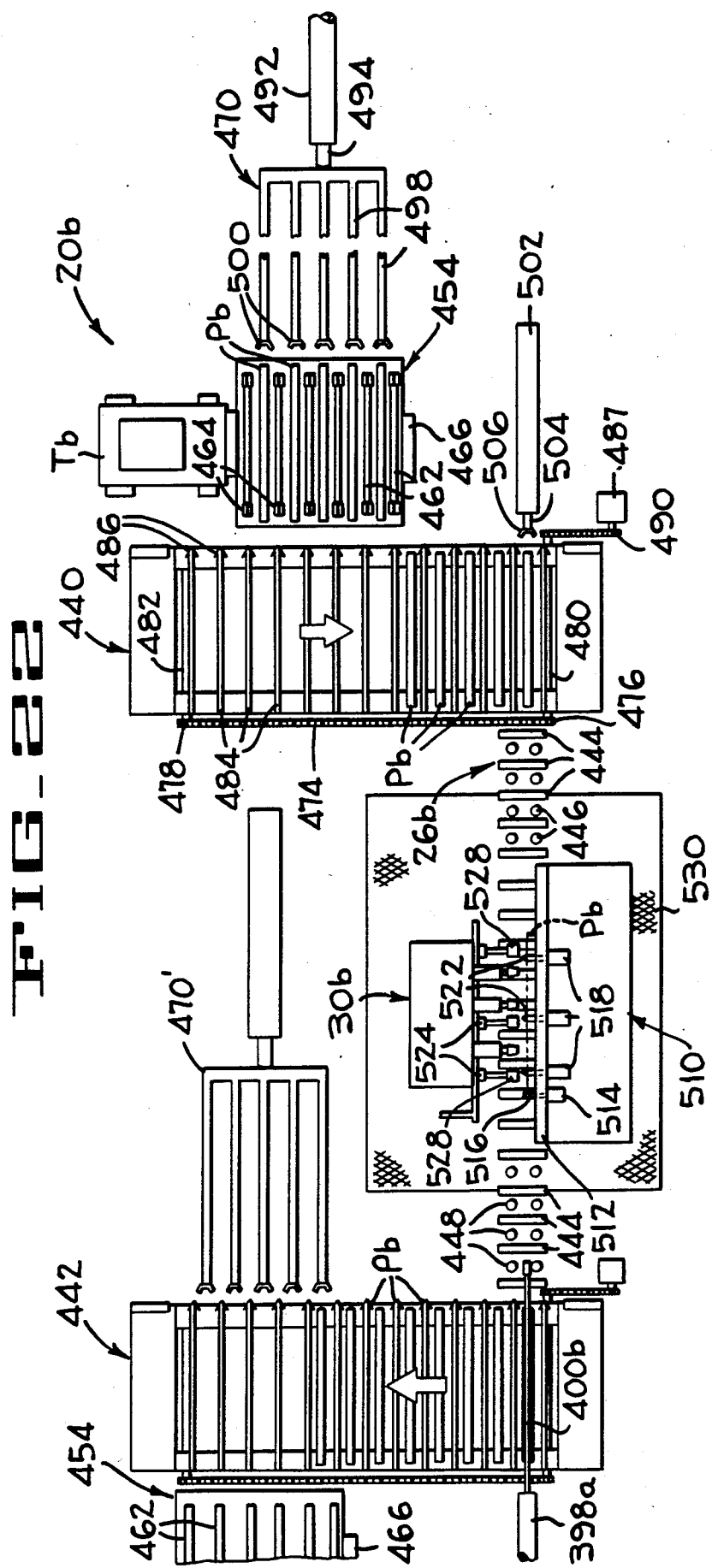
FIG_22

PLATE ROUTING METHOD AND APPARATUS

BACKGROUND OF THE INVENTION

1. Field of the Invention

The present invention relates to method and apparatus for conveying metal plates from a stack of plates through a plurality of stations, performing machinery operations on the plates when positioned horizontally or vertically, blowing debris from the plates, restacking the machined plates and automatically conveying chips and debris to fork lift scrap drums or the like.

2. Description of the Prior Art

Heretofore, large metal plates such as steel or aluminum plates that have been precut to the desired dimensions, and require several different types of machining or other operations performed thereon, required a considerable amount of unnecessary man hours to perform these functions. Workers were required to operate overhead cranes or the like when moving the plates to different processing stations. For example, workers were needed to operate the cranes to stack and unstack the plates at each processing station, to clamp the plates in several different positions at different stations so as to be machined or the like, and to clean and stack the plates after each operation was completed.

SUMMARY OF THE INVENTION

In accordance with a first embodiment of the plate routing apparatus of the present invention a stack of plates to which a plurality of precise machining operations will be performed thereon are first stacked on a vertically indexable feed elevator at a first station; are intermittently pushed off the elevator onto a plate aligning conveyor which completely inspects the plates and feeds overall plate dimension to a computer for more accurate machining. The conveyor accurately aligns the plates longitudinally of the path of movement and advances the plates, one at a time, into second and third processing stations where machining operation such as edging may take place on both the longitudinal and transverse edges; the partially machined plates may then be conveyed to a fourth station at which time each plate is pivoted into a vertical position, the vertical plate is then moved into a fifth station while in the vertical position and is lifted off the conveyor. The plate at the fifth station is then accurately clamped in position to have other machinery operations performed thereon such as milling and/or drilling. The vertical plate is then lowered onto the conveyor and is moved to a sixth station at which time it is pivoted into a horizontal position. The machined plate is then conveyed onto a restacker to form a stack of accurately machined plates which are taken away y a fork lift truck. Chip conveying means are also provided for collecting pieces cut out of the plates, chips, and other debris from the machining operations and moving the chips into selected scrap tubs or carts for sale as scrap metal. All of the above operations are automated, or may be manually controlled, and are performed by the machine requiring only a minimum of operator thereby greatly reducing the required man hours.

In accordance with a second embodiment of the invention a plurality of spaced vertically oriented plates in a fork lift carrier are moved by a fork lift truck or the like along side an intermittently driven feed conveyor, are pushed into the feed conveyor, and are subsequently pushed one at a time onto a narrow roller conveyor. The roller conveyor conveys the vertical plates one at a time into a processing station. A vertical surface plate clamping mechanism rigidly secures each plate in fixed position at the processing station while machine tools perform machining functions on the plate. The machined plates are then conveyed by the driven horizontal rollers conveyor, while in vertical position onto a discharge conveyor and into a fork lift carrier for movement to an assembly area or to storage. The chips and cut out pieces are conveyed into scrap tubs or carts for resale.

BRIEF DESCRIPTION OF THE DRAWINGS

FIG. 1 is an expanded schematic of the automatic plate routing system of the first embodiment of the present invention and illustrating stations 1 through 7.

FIG. 1A is a schematic of a conveying system for collecting cut outs, chips and other debris in selected tubs.

FIG. 2 is a diagrammatic plan of the apparatus of FIG. 1 illustrating the extent of a roller conveying system.

FIG. 3 is s a perspective of a fragment of a horizontal roller conveyor system illustrating the mechanism for attaching upper and lower horizontal rollers to an adjustable frame and further illustrating plate size adjustment means.

FIG. 3A is a vertical section taken along lines 3A—3A of FIG. 3 illustrating a plate thickness sensor for determining whether the plate thickness is within desired limits.

FIG. 4 is a vertical section taken along lines 4—4 of FIG. 3 illustrating a drive system for the lower rollers to control the intermittent movement of the plates through stations 2-6.

FIG. 4A is a fragmentary schematic illustrating an alternate drive system for the lower rollers.

FIG. 5 is a plan of the longitudinal and transverse plate edging mechanisms at station 3.

FIG. 6 is a vertical section taken along lines 6—6 of FIG. 5 illustrating one pair of longitudinal and transverse plate edging mechanisms.

FIGS. 6A, 6B and 6C are diagrammatic operational views illustrating the sequence of operation of the two pair of edgers.

FIG. 7 is a schematic illustrating a portion of one pair of transverse plate edging mechanism.

FIG. 8 is an enlarged section with parts cut away and a plate added, taken along lines 8—8 of FIG. 5 illustrating the front upper and lower transverse plate edging mechanisms.

FIG. 9 is an expanded schematic with parts cut away illustrating the portion of the roller conveyor system where the plates are pivoted from a horizontal to a vertical position, and thereafter advancing the plate into the precision machining station, the width of the conveyor being exaggerated for clarity.

FIG. 10 is a vertical section taken along lines 10—10 of FIG. 9 through the plate pivoting mechanism.

FIG. 11 is an expanded schematic of a plate locating and clamping apparatus with the direction of plate movement by the conveyor being reversed to illustrate the face of the apparatus, the transverse dimensions being exaggerated for illustration purposes.

FIG. 11A is a schematic of a multiple cup suction gripping mechanism for gripping large pieces of metal cut from the plate and turning it 90° for release onto a scrap take-away conveyor.

FIG. 12 is an enlarged schematic of a vertically and horizontally movable clamp supporting mechanism of the plate locating and clamping apparatus illustrating the operative components thereof.

FIG. 13 is a schematic of a vertically movable portion of the plate locating and clamping apparatus.

FIG. 14 is an enlarged central section taken along lines 14—14 of FIG. 11 illustrating one of a plurality of suction cups controlling the pivotal movement of a plate to be machined and the release of the internally routed-out parts onto a conveyor for collection of the cut out portions of the plate.

FIGS. 15, 16, and 17 are progressive operational views in transverse section illustrating the progressive movement of the plate from the roller conveyor into clamping position to be machined.

FIG. 18 is a vertical transverse section through the vertical to horizontal plate pivoting mechanism taken along lines 18—18 of FIG. 2.

FIG. 19 is a side elevation of the restacking mechanism.

FIG. 20 is an enlarged vertical section taken through a spring loaded hook used to pull the plates onto the restacking mechanism.

FIG. 21 is a schematic of a second embodiment of a plate routing apparatus with the plates being vertical at all times.

FIG. 22 is a plan of the plate routing apparatus of FIG. 21.

DESCRIPTION OF THE PREFERRED EMBODIMENT

A first embodiment of the automatic plate routing method and apparatus 20 (FIGS. 1 and 2) of the present invention includes a plate unstacking mechanism 21 at feed Station 1 for receiving a stack 22 of precut horizontal plates P from a fork lift truck T (FIG. 2) or the like. The plates P are pushed off the stack one at a time by a hydraulic ram 24. Each plate is received by a roller feed conveying system 26 (FIGS. 1 and 2) which drives the plate through an inspection Station 2 which inspects the plates for thickness, width and length. If the plate dimensions are found to be proper, or connectable, the feed conveyor system is intermittently driven to advance each plate P into a plate edging mechanism 27 at Station 3 at which time the longitudinal edges are beveled when the plate is being conveyed, and the transverse edges are beveled when the plate is held stationary by the intermittently driven conveyor. Two pairs of three axis edgers are used to bevel the longitudinal and transverse edges. The plate is then advanced to Station 4 at which time each plate, in turn, is pivoted from a horizontal to a vertical position by a plate pivoting mechanism 28 (FIGS. 9 and 10). The edged upright plate P is then conveyed and thereafter clamped into desired position at a precision machining Station 5 (FIGS. 1 and 2) at which time precision machinery 30 performs functions such as drilling, taping, boring, routing, countersinking, cutting and milling on each plate. Each plate is then advanced by the conveyor 26 to a plate pivoting Station 6 for returning the plate from its vertical position to a horizontal position by a vertical-horizontal pivoting mechanism 32 (FIG. 18). Each machined plate P is then conveyed onto a stacking mechanism 34 for subsequent removal of the stack 36 of machined plates P by a fork lift truck T or the like at Station 7.

As best shown in FIG. 1, the plate unstacking mechanism 21 is illustrated as having a base 40 supported on a concrete floor F and having four vertically oriented hydraulic cylinders 42 connected to an indexing table 44 for raising and lowering the table. The table is grooved at 46 to receive the forks of a fork lift truck T (FIG. 2) which is used to place a stack of horizontally oriented plates P upon rollers 48 journaled on the table 44. The hydraulic ram 24 is secured to the floor F by a bracket 50 (only a portion being shown in FIGS. 1 and 2) and includes a piston rod 52 having a forked pusher 54 which engages and pushes the uppermost plate slidably off the stack 22 and into the roller conveyor system 26 and inspection Station 2. After the top plate P is pushed off the stack and the pusher 54 returns rearwardly of the stack of plates P, a conventional optical or an electronic system, such as a photoelectric cell system, and electrical circuits will control the hydraulic system which will index the table 44 upwardly one plate thickness to position another plate in position to be pushed off the stack 22 and onto the conveyor.

Although hydraulic cylinders 42 have been illustrated as the means for raising and lowering the indexing table 44, it will be understood that other conventional elevating means may be used, such as a plurality of hydraulically or electrically operated screws or a scissors lifting mechanism or the like.

As shown in FIGS. 2-4, the feed conveyor 26 comprises a first wide section 60 (FIG. 2) which extends through the first four stations with the plates being horizontal, a narrow intermediate section 62a extends from Station 4 to Station 6, and a full width section 66 which receives the plates P from section 62a and discharges the machined plates one at a time onto the restacking mechanism 34 at Station 7.

A conveyor frame 68 for the wide conveyor section 60 of Stations 2-4 is best shown in FIGS. 3 and 4. A first horizontally elongated channel 70 (FIG. 3) is rigidly secured to a plurality of posts 72 (only one being shown) which are rigidly secured to the floor F. A plurality of short, spaced vertical side guide rollers 74 are journaled in bearings (not shown) and extend to the input end of the plate pivoting Station 4.

A second generally horizontal channel 78 is adjustably secured to the plurality of posts 72 (only one being shown) interconnected by a fixed vertical wall 81. Slotted angle members 82 and cap screws 84 are provided for accommodating plates P of different widths. The channel 78 is of the same length as the channel 70 and terminates prior to reaching the plate pivoting Station 4. Transverse slots 86 are formed in upper and lower flanges of the channel member 78 and slidably receive the shafts 88 of a plurality of vertically oriented, short, spring loaded adjustable side guide rollers 90. The shafts 88 are held in place by T-shaped sliders 92 removably secured to the shafts 88 and slidably received in the slots 86. Adjustment bolts 94 extend through holes in ears 96 welded to the channel member 78 and are screwed into associated ones of the sliders 92. Springs 98 are connected between the ears and sliders and resiliently urge the rollers 90 against the plates P with sufficient force to cause the opposite longitudinal edge of the plate to bear firmly against the rollers 74. Stop nuts 100 on the bolts limit the amount of movement of roller travel to the left (FIG. 3) so that the side guide rollers 74,90 will allow plates P to be fed therebetween.

A plurality of lower horizontal rollers 106 (FIGS. 1, 3 and 4) are rotatably supported by the channel member 70 and the vertical plate 81 and extend through longitudinally spaced clearance openings 105 in the channel member 78. As shown in FIG. 4, a chain drive 107 is provided to intermittently drive the roller 106 each of which has a sprocket 108 secured thereto and is driven toward the left (FIG. 4) by a motor 110 and a chain 112. The chain is trained over the sprockets 108, and over an idler sprocket 114. The lower run and upper run of the chain ride along chain guides 116 bolted to the channel member 70.

In many applications of the plate routing apparatus it is desirable to be able to start and stop different portions of the conveyor, and to drive different portions of the conveyor at different speeds. Thus, in place of the chain drive 107, a plurality of individually controlled reversible motors 110a (FIG. 4A) may be secured to the conveyor frame 70 and are connected to selected ones of the lower rollers 106. For example, every second or third roller may be connected to a motor 110a. A computer (not shown), or a manually operated electric circuit would then control the movement of the plates P at the desired speeds at different locations along the conveyor 26.

A plurality of horizontally disposed upper rollers 120 (FIGS. 1, 3 and 4) have the ends of their shafts 122 rotatably received in T-shaped sliders 124 that are slidably received in vertical slots 126 in the channel member 70 and in the plate 81 (FIG. 3). The upper rollers 120 also extend through the clearance openings 105 in channel 78. Springs 132 are attached between each slider 124 and lugs 134 welded to the channel member 70 and to the wall 81. The springs 132 urge the upper rollers downwardly against the plates P to provide adequate driving and plate hold down forces. The upper rollers 120 are provided only for Stations 1-3.

As each plate enters inspection Station 2, each plate P is tested for thickness, width and length. The thickness of the plates purchased from a supplier are in many cases slightly thicker (or thinner) than that specified by the purchaser by about +/− 60 thousands of an inch. The exact thickness of the plates may be determined by mounting a pair of sensors 149 (FIGS. 1 and 3A) in positions to contact fixed stops 149a. The sensors may be sensitive micro switches mounted on the slider bearings 124 of associated ones of the upper spring loaded rollers 120 at the inspection Station 2. The deviation from the desired plate size is then transmitted to a conventional tape controlled computer, commonly known as a Computer Numerical Control (CNC) computer (not shown). The defective plate may then be removed from the plate routing apparatus under the control of the computer; or alternatively, it may be removed from the apparatus by manually operated controls available to an operator. It will be understood that removal of an improperly sized plate does not affect the operations being performed on plates at other stations in the apparatus.

Alternately a laser beam (not shown) may be substituted for the micro switch with the error in thickness being fed into the CNC computer. The sensor 149 or laser is accurate to about a tenth of one thousands of an inch.

The reason for determining the exact plate thickness is, for example, to determine the exact depth needed for counterbores or the like to be made in the plate P. In this example, if the plate is ten thousands of an inch thicker than the specified thickness (for example 1.500″) and a plurality of counterbores are to be bored to a specified depth to accurately support a sub-assembly in the counterbores, the sub-assembly would be ten thousands of an inch off specification thereby requiring considerable rework or scrapping of the plate or sub-assembly.

If the thickness of the plate P varies substantially from the desired thickness, the motor 110 (FIG. 4) or the motors 110a (FIG. 4A) may be reversed to drive the defective plate back into the unstacking Station 1 for removal from the system by the fork lift truck T.

If the improper thickness is relatively small and is correctable, the operator may instruct the CNC computers to correct the machining operation. In the above counterbore example, the operator would instruct the computer to make the counterbore ten thousands of an inch deeper.

When the plate P is in the plate edging Station 3 (FIGS. 5-8) bevels B are provided in longitudinal edges 142,144 and in transverse edges 146,148, to aid in subsequent welding or the like of the plates to other plates or components. The plates P are first milled on the upper and lower longitudinal edge 144 (FIG. 6A) as each plate is being moved into Station 3. Thereafter, when the plate is held stationary, upper and lower bevels are cut on the transverse edges 146,148 (FIG. 6B), and upper and lower bevels are cut in the edge 142 when the plate is moved in the direction of the arrow in FIG. 6C. It will be understood that the edging operation will be completely eliminated if square edges are desired, or that other combinations of bevels may be used if desired.

Having reference to FIGS. 5, 6 and 6A, the longitudinal edge 144 is edged by a first pair of upper and lower power driven plate edgers 150,152, each of which is movably supported on transversely extending racks 153,153a bolted between the channel 70 and the vertical wall 81. Similarly, the longitudinal edge 142 (FIGS. 5, 6B and 6C) is edged by power driven edgers 154,155 (FIG. 8) each being movably supported on a rack 156,156a, respectively, which are bolted to the channel 70 and the vertical wall 81. It will be understood that the racks 153,153a and 156,156a are accurately spaced a predetermined distance apart so that the transverse edges of a batch of plates P of identical length will be properly edged. When edging plates P of different lengths, the spacing between the racks must be adjusted accordingly.

Prior to describing the specific features of the two pairs of edgers 150,152 and 154,155, it is believed that it would be helpful to first describe the sequence of operation performed by the edgers, and thereafter describe the specific components of the edgers. Each edger includes an associated rotary cutter or milling head 150a, 152a, 154a and 155a.

As best shown in FIGS. 5, 6B, 6C, 7 and 8, each pair of edgers 150,152 and 154,155 provides bevels in a longitudinal and a transverse edge of the plate P. In this regard, the milling heads 150a, 152a (FIG. 6A) first provide upper and lower bevels B on the left longitudinal edge of the plate P in response to the plate being moved in the direction of the arrow. After the plate P is moved into precise position to have both transverse edges to be beveled as shown in FIG. 6B, the milling heads 150a, 152a are first pivoted vertically about horizontal axes into substantially horizontal positions, are then pivoted 90° about vertical axes above and below, respectively, the adjacent corner of the plate; and are then returned to their edging positions in alignment with the transverse edges 148 all as indicated by the arrows of the left lower corner in FIG. 6B. The edgers 154,155 are usually pivoted into position to bevel the leading transverse edge 146 prior to the plate P being moved into position to be transversely edged. The edgers 150,152 and 154,155 may bevel the transverse edges 148,146 of the plate when moving transversely into either direction.

After the milling heads 150a,152a,154a and 155a have beveled edges 144,146 and 148, the heads 154a,155a are pivoted about horizontal axes to move them away from plate P thereby preventing interference with the adjacent corner of the plate P. Thereafter, the heads 154a,155a are pivoted into position to bevel the longitudinal edge 142 in response to the plate moving in the direction of the arrow in FIG. 6C.

Since the edgers 150,152154 and 155 are substantially the same, only the mechanical details of the upper edger 154 (FIGS. 7 and 8) will be described in detail. The edger 154 includes a frame 158 having a T-shaped slot therein which rides along a T-rail 160 rigidly secured to the rack 156. A pinion 161 meshes with the teeth of the rack 156. A pinion 161 meshes with with the teeth of the rack 156 and is secured to the shaft of a reversible edger translating motor 162 mounted on the frame 158. A gear 163 is secured to a vertical pivot pin 164 which pin is secured to a pair of ears of the frame 158 and projects outwardly thereof to pivotally receive a horizontally pivotable housing 166.

An edger swing motor 167 is secured to the housing 166 and drives a vertical shaft 168 having a gear 169 keyed thereto which meshes with the gear 163 for pivoting the edger 90° about the vertical axis of shaft 164 between the illustrated position for beveling the forward transverse edge 146 and a position for beveling the longitudinal edge 142. The edger 154 includes the rotary cutter or milling head 154a that is secured to the shaft of a milling head motor 173. A housing of motor 173 and a gear 175 are rigidly secured to a horizontal shaft 176 which is journaled in the horizontally pivotable housing 166. A milling head pivoting motor 177 is secured to the pivotable housing 166 and drives a gear 178 which meshes with the gear 175 and, when energized, pivots the cutter 172 about the horizontal axis of shaft 176 between the illustrated cutting position and a generally horizontal position so that the rotary milling head 154a will clear the adjacent corner of the plate P when pivoted between positions for beveling a transverse edge and a longitudinal edge of the plate P.

As illustrated in FIG. 8, at least the upper edger 154 has a chip shield 180 secured thereto with an edger guide roller 182 attached thereto. Face guide rollers 183 are attached to the housing of the milling head motor 173 thereby assuring that the milling head 154a is properly positioned to bevel the upper portions of transverse edge 146 and longitudinal edge 142 as illustrated in FIGS. 6B and 6C.

It will be understood that the other edgers 152 and 155 are substantially identical to the above described edger 154 but are inverted and are positioned below the plate P. As best illustrated in FIG. 6B, the lower milling heads are not in vertical alignment with the associated upper heads but are staggered thereby minimizing fouling of the lower cutters with chips from the upper cutters.

It will be understood that the transverse edges of batches of plates P of different lengths may be beveled by merely bolting the racks 156 and 156a in the desired position to a CNC controlled position to accommodate the particular length of the plate. The longitudinal edges of the plates of different widths may be machined by adjusting the channel member 78 inwardly or outwardly as previously described.

It will be noted that certain side guide rollers 90 and pairs of upper and lower rollers 120,106 (FIGS. 5 and 8) are removed to provide operating space for the edgers 150,152, 154 and 155; and that the edgers when not operating are stowed within the channel member 78.

When each plate P is moved into the plate pivoting mechanism 28 at Station 4, the plate is supported only upon the lower rollers 106 as illustrated in FIGS. 9 and 10. The vertical dimension of the channel member 70 is increased in height as indicated at 70a so as to exceed a height in excess of the full width of the widest plate P to be processed. A plurality long vertically extending idler rollers 74a are journaled in the channel member 70a. The channel member 78 with its vertical idler rollers 90 therein continue to the downstream end of the pivot Station 4.

As shown in FIGS. 9 and 10, the plate pivoting mechanism 28 includes a hydraulic ram 242 that is secured to the floor F and is inclined upwardly and inwardly toward the channel member 70a. The ram 242 is stabilized by an arm 243 connected to the floor F. A freely rotatable ball 244 is secured to the piston rod 246 of the ram. In response to activating the ram 242 to extend the piston rod, the plate P will be moved from a horizontal to vertical position against the tall idler rollers 74a.

A plurality of plate confining rollers 250 are freely journaled on a lever assembly 252 that is pivotally connected to the upper edge of the channel member 70a. A hydraulic ram 254 is connected between the lever 252 and a bracket 256 secured to the channel member 70a. When the piston rod of ram 254 is retracted, the rollers 250 are spaced above the arcuate path of movement of the upper edge of the plate P thereby permitting the plate to move to a vertical position. The rod of the ram 254 is then extended thereby moving the rollers 250 downwardly into position to maintain the plate in a substantially vertical position as it is advanced into the narrow section 62a of the conveyor 26. If plates P having shorter width are to be processed, then the rollers 250 may be replaced by a group of longer rollers (not shown).

The narrow section 62a (FIG. 2) of the conveyor 26 passes through the precision machinery Station 5 and terminates at Station 6. The narrow section 62a includes an entry section 266 (FIG. 9) which is provided with a plurality of tall left and right idler rollers 74a,267 and a plurality of short horizontal rollers 268 which are intermittently driven toward the precision machinery 30 in Station 5 thereby advancing upright plates P into Station 5 between the precision machinery 30 and a plate locating and clamping apparatus 270.

The plates P are intermittently advanced into approximate machining position and thereafter to Station 6 when supported on additional ones of the driven horizontal rollers 268. In the area between the machinery 30 and the plate locating and clamping apparatus 270, vertical guide rollers are omitted to permit machine tools to be adjusted into a plurality of different positions as well known in the art.

As shown in FIGS. 11–14, the plate locating and clamping apparatus 270 comprises a removable housing 272 having a fixed front face 274 provided with vertical clamp receiving slots 276 for receiving a plurality of retractable clamp hooks 278,278a; a plurality of holes 280 for receiving a plurality of vertically spaced, retractable edge locating pins 282 for locating one vertical edge of the plate P; and a second plurality of holes 284 for receiving a plurality of horizontally spaced retractable edge locating pins 286 for accurately locating the lower horizontal edge of the plate P. The pins 282 and 286 are reciprocated by hydraulic cylinders 282a and 286a (FIG. 1) between a retracted position and a plate supporting position. An additional opening 288 in the front face 274 accommodates a plate positioning hydraulic ram 290 which is movable between a position within the housing 272 and the illustrated position (FIG. 11) for urging the plate against the vertically spaced locating pins 282.

In order to accommodate plates P of different heights, a two-piece vertically and horizontally adjustable frame 296 (FIG. 12) includes a lower section 298 having the lower clamp hooks 278 rigidly secured thereto; and a vertically adjustable upper section 300 connected thereto in the desired position by a plurality of slots 302 and cooperating cap screws 304. The upper set of clamp hooks 278a are slidably received for vertical movement in slide ways 306 in the upper section 300. The upper clamp hooks 278a are rigidly secured to a beam 308 (FIG. 13) that is vertically moved by a hydraulic ram 310 connected between an angle bracket 312 bolted to the upper section 300 (FIG. 12) of the plate 296 and the beam 308. Thus, the upper clamp hooks 278a may be elevated sufficiently by the hydraulic ram 310 to allow the lower edge of a plate P to be raised higher than the lower hooks 278. The hooks 278,278a and the hydraulic ram 290 (FIG. 11) may then be moved outwardly of the housing 272 by a hydraulic ram 316 into position to receive the plate P. Four channel tracks 317 are secured in fixed position; and four rollers 317a rotatably attach to the adjustable frame 296 by slots and cap screws 318 allow the frame to be easily moved horizontally and adjusted vertically for accommodating plates of different widths. The hydraulic ram 316 has its case anchored in fixed position to the housing 272 and has its rod connected to the two piece frame 296. A plurality of spacer bars 319 (FIG. 11) are bolted to the front face 274 of the housing 272 to permit certain machining operations to be cut completely through the plate P. The bars 319 may be bolted to different locations on the face 274 to permit through cuts at all locations.

A hydraulic plate lifting ram 320 (FIG. 11) has a fork 322 mounted on the piston rod 324 of the ram and projects upwardly between two lower rollers 268. A pair of U-shaped members 325 are welded to the upper ends of the fork 322 to cradle the lower edge of the plate P therein. When the plate P to be machined is advanced by the intermittently driven conveyor 26 into position to be raised onto and clamped by the clamping apparatus 270; the edge locating pins 282,286; the clamp hooks 278,278a; and the positioning ram 290 are retracted. A guide rail 326 is secured to the precision machinery 30 to aid in maintaining the plate P substantially vertical.

The hydraulic ram 320 is then activated to raise the fork 322 into engagement with the bottom edge of the plate P thereby raising the plate into position to be received between six clamp hooks 278,278a after the hooks have been projected out of the housing 272 by the ram 316. At the same time, the rams 282a and 286a (FIG. 1) move the plate locating pins 282,286 outwardly into plate receiving position. Thereafter, the fork 322 (FIG. 11) is lowered to its retracted position below the plate supporting plane of the rollers as shown in FIG. 11 thereby lowering the plate P onto the pins 286 and the lower clamp hooks 278. FIGS. 15, 16 and 17 diagrammatically illustrate the sequence of performing the plate lifting and gripping operation. The piston rod of ram 310 (FIG. 13) is then retracted until the upper clamp hooks 278a engage the upper surface of the plate P. The piston of the ram 316 (FIG. 12) is then retracted to firmly clamp the plate P against the spacer bars 319 (FIGS. 11 and 15–17) thereby securely and accurately maintaining each plate P, in turn, in position to be machined.

During the machining operation a plurality of high pressure air nozzles 326 (only one being shown in FIG. 11) may be used to deflect chips and other debris downwardly away from the plate P to be collected as will be described hereinafter. Since the plate P is vertical when machined at Station 5, the chips are easily deflected off the plate P.

It will be noted that the previously described ram 290 which urges the plate P firmly against the locating pins 282 is secured to the two piece vertically and horizontally adjustable frame 296 by a bracket 328 (FIGS. 11 and 12). A vacuum system having spring loaded suction cups 330 (FIG. 12) may also be used to assist in gripping the plate P and moving it against the plate locating and clamping apparatus 270. The suction cups 330 (FIG. 14) are secured to the two piece CNC controlled vertically and horizontally adjustable frame 296 (FIG. 14). Each suction cup 330 is connected to a tubular piston rod 334 which extends through both end walls of a cylinder 336 and extends through a hole in the front face 274 of the plate locating and clamping apparatus 270. A piston 338 is secured to the piston rod 334, a spring 340 is disposed between the piston and one end wall of the cylinder for normally retracting the suction cup 330 rearwardly of the outer faces of the spacer bars 319. After a plate P has been conveyed into a position to be raised and moved between the clamp hooks 278,278a, a high pressure fluid (air or hydraulic fluid) is directed into the cylinder through conduit 342 thereby compressing the spring 340 and urging the suction cup 330 outwardly into engagement with the plate P which may be slightly tilted as indicated in FIG. 14. A source of vacuum (not shown) is connected to the tubular piston rod 334 and has a valve 346 therein which is opened to create a vacuum in the several cups 330 thereby firmly gripping the plate P. High pressure fluid is then directed into a conduit 348 which moves the plate P against the spacer bars 319 while fluid in the other end of the cylinder is discharged through conduit 342. The upper and lower clamp hooks 278a,278 are then extended as shown in FIG. 16, the fork 322 is lowered thereby allowing the lower edge of the plate to move over the lower clamp hooks 278. At this time retractable edge locating pins 282 and 284 are extended as shown in FIG. 11. The plate positioning ram 290 is then actuated to move the plate P into machining position and is thereafter retracted; the upper hooks 278a are then lowered by ram 310 (FIG. 13) into plate gripping engagement; and the ram 316 (FIG. 12) is then retracted thereby firmly clamping the plate in machining position against the spacer bars 319 as shown in FIG. 17.

Once the plate P has been clamped in place, the conventional five axis/three head vertical milling machine 30 (FIG. 2) may be used to route all internal cuts, make chamfers, bores, counterbores and other desired machining operations. Since a five axis/three head vertical milling machine is used, standard cylindrical mill cutters can be used instead of angled routers thereby greatly minimizing the cost of the cutting tools and the cost of sharpening the tools. It will be understood, however, that other machines may be substituted for the milling machine 30 to perform various cutting and grinding operations; or to perform other operations such as welding parts on a piece of work which may be a plate or other type of stackable work.

It will be recognized that the above described components at machining Station 5 have been simplified in order to adequately describe the structure and its mode of operation. For example, the clamp hooks 278,278a may be in the form of independently operated hooks which may be rotated to release the plate, and may be fully retracted behind the front face 274, when a machining operation is to be performed on an edge of the plate P. Selected ones of the edge locating pins 282 and 284 may also be independently retracted for the same purpose.

Although the milling machining is a conventional milling machine, certain machining operations on the plate P may require that large pieces of the plate be cut out. In order to controllably remove large cut-out pieces CO (Figs. 1A and 11A) of the plate without having the large cut-outs fall upon and damage machine tools, a multiple suction head 249 (FIGS. 11 and 11A) having multiple cups thereon is disposed, when retracted, adjacent the face of the milling machine 30. The suction head 249 is mounted on an arm 251 that is pivotally supported by the head of a piston rod 253a of a hydraulic ram 253. A second ram 255 is pivotally connected between the arm and a bracket attached to the piston rod 253a. Thus, when a large piece of the plate P is being cut-out of the plate P, the ram 253 is actuated to move the suction head 249 and cups thereon into gripping engagement with the piece to be cut-out. The piece is then cut out, the piston rod of the ram 253 is retracted, the second ram 255 is then actuated to pivot the cut-out 90°, and the vacuum is then released allowing the large cut-out CO to fall onto a take away conveyor 257 for discharge as will be described later.

After the plate P has been machined at Station 5, substantially the reverse of the above described plate clamping operation is performed. More specifically, with the suction cups 330 (FIG. 12) gripping the machined plate P; the ram 316 is actuated to release the clamping force on the plate P, the ram 310 (FIG. 13) is actuated to raise the upper clamp hooks 278a a sufficient distance to permit the machined plate to pass between the upper and lower clamp hooks 278a,278; the ram 320 is then actuated to lift the lower edge of the plate P above the uppermost level of the lower clamp hook 278 and the piston rod of the plate positioning ram 290 remains retracted behind the fixed front face 274. The ram 316 (FIG. 12) is then actuated to retract the clamp hooks 278,278a behind the fixed front face 274 of the plate locating and clamping apparatus 270; and the ram 320 is actuated to lower the fork 322 and plate P until the machined plate is again supported on the rollers 268. The roller conveyor 26 then advances the machined plate P along narrow intermediate section 62a (FIG. 2) to the second plate pivoting Station 6.

The second plate pivoting mechanism 32 (FIG. 18) is similar to the first plate pivoting mechanism 28 but is operated to lower a machined plate P from the vertical to a horizontal position. The mechanism 32 comprises a plurality of wide horizontal rollers 106a journaled in channel frame member 360,362 and are intermittently driven by the chain drive 104. Tall idler rollers 74a are journaled in channel frame member 360, and short idler rollers 90a are journaled in the frame member 362a. The member 362a is bodily adjusted toward or away from the tall rollers 74a, and the rollers 90a are spring urged toward the tall rollers by mechanism that is the same as that illustrated in FIG. 3.

When the vertically oriented plate P is moved from the machining station 5 to the plate pivoting station 6, the upper end of the plate is received between the tall rollers 74a and a plurality of spaced rollers 364 (only one being shown) attached to a horizontal bar 366 rigidly secured to a lever arm 368 that is pivotally connected to the channel 360 by a pivot pin 370 and bracket 372. A plate tilting arm 374 is secured to the lever arm 368 and is positioned to extend through a slot 376 in the frame member 360. A hydraulic ram 378 is pivotally connected between the arm 368 and the frame member 360 and when retracted causes the rollers 364 to move above the upper edge of the plate P as indicated in dotted lines in FIG. 18 while the tilting arm 374 engages and pushes plate P against a ball 380 journaled on the extended piston rod of an inclined hydraulic ram 382 that is secured to the floor. As the piston rod and ball 380 are moved downwardly, the upper edge of the plate P moves arcuately downward and first engages the spring loaded rollers 90a forcing them to move slightly to the right (FIG. 18) thereby urging the opposite edge of the plate firmly against the tall roller 74a. In this way it is assured that the left edge of the plate (FIG. 18) will be parallel to the direction of movement of the feed conveyor system 26.

Upon the next indexing movement of the conveyor system 26 the machined plate P is at least partially moved into the plate restacking Station 7 (FIGS. 1 and 2).

The restacking mechanism 34 (FIGS. 1, 2, 19 and 20) is substantially the same as the unstacking mechanism 21 (FIG. 1). The restacking mechanism comprises a base 384 (FIG. 19) supported on the floor F and having four hydraulic rams 386 (only two being shown) directed upwardly. Piston rods 388 of the ram are secured to a table 390 having fork lift slots 392 therein. A plurality of horizontal idler rollers 394 are journaled on the table 390 and intermittently receive machined plates P thereon from the plate pivoting Station 6 in response to the plate supporting rollers 106a being intermittently driven by the conveyor motor 110 (FIG. 4).

In order to assure that the machined plates P are evenly stacked on the table 390 a cylinder 396 of a hydraulic ram 398 is secured in fixed position to the floor, and its piston rod 400 has a pivotable hook 402 (FIG. 20) thereon. The hook 402 is normally held in the illustrated vertical position by a spring 404. The forward end of the hook 402 is beveled at 406 thereby permitting the hook to pivot rearwardly in response to extension of the piston rod 400 and engagement of the hook with the leading edge of each machined plate P entering the restacking Station 7. When the hook moves over the trailing edge of each plate, in turn, the hook is spring urged into its vertical position and the piston rod 400 is retracted thereby pulling the plates P, one at a time, onto the stack and against the vertical stop bar 408 in response to retraction of the rod 400. As each plate P is moved into place upon the stack of plates, a conventional photoelectric cell (not shown) and light source or the like senses its presence by scanning transversely of the plates and activates the four hydraulic rams 386 which lowers the table 390 the thickness of each plate P.

Having reference to FIG. 1, a chip and debris collecting device 420 is illustrated at the precision machining Station 5. A grating 422 is provided at the machining station to provide a perforated floor upon which workmen may stand when servicing the precision machinery or the like. The grating has a mesh large enough to allow chips and other small debris to fall through the grating onto a wide driven conveyor 424. The wide conveyor discharges the chips onto a driven cross conveyor 426 which discharges the chips into a chip tub 428 which when filled is hauled away by the fork lift truck T (FIG. 2) for storage and subsequent sale as scrap metal. Scrap tubs are also positioned under Station 3 to collect chips from the edging operation.

As previously mentioned, large cut-outs CO (Figs. 1A and 11A) and smaller pieces of the plate P may be removed from the plate and fall directly onto the conveyor 257 through an opening in the grating 422. The conveyor 257 (shown cut-away in FIG. 1A) deposits the large cut-outs CO and smaller pieces of different sizes onto a discharge conveyor 431. The conveyor 431 includes a cantilever frame 432 secured to an upstanding shaft 433 which is journaled in a frame 434 secured to the floor F. A reversible motor 435 and a gear drive 436 are provided to drive the forward end of the conveyor 431 in an arc above a plurality of scrap tubs 437 arranged in an arc. A second motor 438 drives the upper run of the conveyor 431 toward the tubs 437. Control means (not shown) energizes the reversible motor 435 in response to detecting different size pieces of the plate P on the discharge conveyor 431, thereby causing the motor to align the conveyor 431 with the proper bin to receive the proper size of scrap metal. Chips which fall on the conveyor 257 may be blown off by air nozzles (not shown) for collection in the chip tub 428.

Conventional hydraulic, vacuum, and electric control circuits may be employed to intermittently drive the conveyor 26, and sequentially operate the several components of the automatic plate routing apparatus. Preferably the operation of the apparatus is controlled by a tape or computer, although it is to be understood that the apparatus may be manually operated by use of switches, valves and the like.

Conventional optical plate thickness devices may also be included in the controls to inspect the plate and assure that each plate has the proper overall size and thickness. If a plate does not comply with thickness or size requirements, the control system would stop the conveyor line and signal for operator's assistance and subsequent removal of the defective plate. Alternately, the thickness devices can tell the computer system where the surfaces are relative to maximum and minimum acceptable plate thickness and suitable corrections can be initiated by the computer. For example, if the plate is found to be thicker than the acceptable thickness, and counterbores are to be cut into the plate to receive legs of a mating part, the counterbores can be cut deeper thereby assuming that the mating part will be precisely positioned.

The system greatly reduces manpower by about five out of every seven people needed to produce subassembly plates P used in mass production of heavy vehicles, and also reduces scrap and reworking of defective assembly due to its accuracy in machining the plates. The system will eliminate about 50 percent of the time, as compared to certain known plate handling processes, and will eliminate about one in three people needed to rework defective assemblies of the plates due to improper dimensions of the basic plate sub-assemblies which are machined by the apparatus of the present invention.

A second embodiment of the plate routing method and apparatus 20b of the invention is disclosed in FIGS. 21 and 22 and differs from the first embodiment primarily in that the plates Pb are at all times in a vertical position thereby eliminating the need for any plate pivoting stations. Also for simplicity, plate edging mechanisms have not been illustrated in the second embodiment although it will be understood that they may be used on the apparatus 20b by the same type of apparatus disclosed in regard to the first embodiment but with the edging mechanism mounted to operate on plates when positioned vertically.

Since many of the components of the second embodiment are similar to those of the first embodiment, components of the second embodiment which are similar to those of the first embodiment will be assigned the same numerals followed by the letter 'b'.

As illustrated in FIG. 21, the plate routing apparatus 20b of the second embodiment comprises a plate feed conveyor 440 and a similar discharge conveyor 442 which supports the plate Pb when in a vertical position. The feed conveyor 440 intermittently advances the plates one at a time onto a roller conveyor 26b having short horizontal intermittently driven plate supporting rollers 444 and tall closely spaced idler rollers 446,448 which are journal in a suitable frame (not shown). The horizontal rollers 444 extend the full length between the feed conveyor 440 and the discharge conveyor 442. The first and second groups of tall idler rollers 446 and 448 extend between the plate feed conveyor 440 and the precision machinery mechanism 30b; and between the mechanism 30b and plate discharge conveyor 442, respectively.

As illustrated in FIGS. 21 and 22, a plurality of plates Pb after being cut into the desired length and width are loaded, when in the upright position, by cranes or the like into a plurality of fork lift plate storage carriers 454 (only two being shown). Each storage carrier 454 includes a rigid base 456 having fork lift slots 458 therein and a plurality of plate positioning slots 460 in its upper surface for receiving the lower edges of associated plates Pb. A plurality of upright plate separators 462 having tapered plate guides 464 on their upper ends are rigidly secured to the rigid base 456. The tapered guides 464 and slots 460 cooperate to guide the plates between the associated separators 462 and maintain the plates substantially vertical.

It will be understood that a plurality of plate storage carriers 454, after receiving a plurality of properly sized plates Pb therein, are usually stored in an area close to the feed conveyor 440 by a fork lift truck Tb (FIG. 22). When plates are to be processed by the plate routing apparatus 20b, the fork lift truck Tb removes a loaded carrier 454 from the storage area and moves it into a plate transfer position against a stop block 466 between one side of the intermittently driven feed conveyor 440 and a multiple plate transfer apparatus 470. The intermittently driven feed conveyor 440 includes a pair of endless chains 474 trained over pairs of sprockets 476,478 secured to shafts 480,482. Guide rails (not shown) support the upper runs of the chains 474. The conveyor has a plurality of plate separators 484 thereon that are spaced apart the same distance as the separators 462 of the storage carriers 454. Bevel plate guides 486 are secured to the inlet end of the separators 484 to guide the plates Pb onto the conveyor 440. The feed conveyor 440 is intermittently driven by a conventional gear motor 487 and chain drive 490.

The discharge conveyor 442 is substantially the same as the feed conveyor 440 but driven in the opposite direction and accordingly will not be described in detail.

The multiple plate transfer mechanism 470 includes a hydraulic ram 492 which is secured to the floor Fb, and has a piston rod 494 connected to a multiple pronged pusher head 496. The pusher head is provided with a number of prongs 498 having cupped end portions 500 equal in number to the number of plates accommodated by the fork lift carriers 454 and thus pushes all the plates off the storage carrier 454 onto the feed conveyor 440 in response to the piston rod 494 being extended and thereafter being retracted. A similar transfer mechanism 470' is provided for pushing machined plates Pb out of the discharge conveyor 442 into an empty storage carrier 454 aligned with the conveyor 442.

A single hydraulic ram 502 has a piston rod 504 provided with a forked pusher 506 with generally concave plate engaging surfaces connected thereto. When the plate feed conveyor 440 indexes a plate Pb in alignment with the ram 502, extension of the piston rod 504 pushes a plate Pb off the feed conveyor 440 onto the intermittently driven conveyor 26b. After the feed conveyor 440 has been indexed to a position which moves the rearmost plate Pb forwardly of the foremost plate in the fork lift carrier 454, the hydraulic ram 492 is activated to push all plates therein out of the carrier and onto the conveyor 440 between the adjacent plate separators 484. The fork lift truck T may then take the empty carrier 454 to the storage area to be refilled with plates Pb and may carry another full carrier into the transfer position between the feed conveyor 440 and the transfer mechanism 470.

The roller conveyor 26b then intermittently moves the plates Pb, one at a time, into position to be machined by the precision machinery 30b which may be a conventional five axis milling machine with three universal heads with a tool changer on at least one of the heads.

A sturdy frame 510 includes a vertical face plate 512 which is rigidly secured to the floor Fb and serves to guide the plate Pb into position to be machined and further serves as a immovable back stop to resist the pressure applied by the tools during the machining operation. The face plate 512 has a plurality of vertically spaced hydraulic cylinders 514 (only two being shown) secured thereto with their plate locating and stop pins 516 being projected through spaced holes (not shown) in the face plate when a plate Pb is to be stopped and accurately located in machining position.

Also, a plurality of horizontally spaced hydraulic plate supporting cylinders 518 are secured to the face plate 512 and have plate supporting pins 520 which project through holes in the face plate 512. The supporting pins 520 are slightly higher than the horizontal driven conveyor rollers 444 and have frusto-conical ends 522 which engage and lift the plate Pb slightly above the level of the rollers 444. Thus, the stop pins 516 and supporting pins 520 serve to accurately support the plate Pb in machining position. The plate Pb is firmly clamped against the face plate 512 by a plurality of hydraulic clamping cylinders 524 (only three being shown) which are secured to a rigid bracket and engage the end portions and the upper and lower edge portions of the plate Pb. The hydraulic clamping cylinders 524 each include a piston rod having a clamping head 528 thereon. Prior to extending the plate supporting pins 520, the piston rods and clamping heads 528 are moved close to the plate Pb thus preventing the supporting pins 520 from pushing the plate Pb toward the precision machinery 30.

The plate machining operation is substantially the same as that performed in the first embodiment and accordingly will not be described further. After each plate Pb has been machined, it is advanced at least partially into the discharge conveyor 442 by conveyor 26b. A spring loaded hook 402b (similar to that shown in FIGS. 19 and 20 of the first embodiment) is connected to the piston rod 400b of a hydraulic ram 398b and is employed to pull the plate Pb into an empty space between two plate separators on the discharge conveyor 442.

As in the first embodiment, the second embodiment includes a grating 530 through which metal chips and other debris will fall which will be collected by conveyors and deposited in fork lift chip tubs (not shown). Also, a cut-out collecting and conveying system (not shown) but similar to that disclosed and described in regard to FIG. 1A and 11A may be incorporated in the second embodiment of the invention.

Although multiple plate transfer apparatus 470,470' has been illustrated, it will be understood that single pronged transfer apparatus (not shown) but similar to the single hydraulic rams 502 may be used to transfer plates P, one at a time, from storage carriers 454 or the like which are intermittently moved in directions opposite to the directions indicated by the arrows illustrating the carrier movement direction in FIG. 21. Single pronged transfer means may be used when individual plates or small batches of plates are to be processed.

From the foregoing description it is apparent that two embodiments of the automatic plate routing method and apparatus have been described for performing several machining operations on large plates as they are intermittently moved from station to station. The apparatus accurately performs machining operations such as edging, milling, drilling and making cut-outs with a substantial savings in processing time, in man hours required, and in the amount of rework necessary due to improper dimensions while providing more accurately machined plates. Also, the plates may be machined while oriented vertically or horizontally.

Although the best mode for carrying out the present invention has been herein shown and described, it will be apparent that modification and variation may be made without departing from what is regarded to be the subject matter of the invention.

What is claimed is:

1. A plate routing method comprising the steps of:
  moving a plurality of plates of equal size onto a conveyor one at a time;
  intermittently driving the conveyor for moving each plate in turn into a precision machining station having a power drive cutting tool therein;

lifting the plates off the conveyor for supporting the plates above the conveyor at a precise height relative to the cutting tool;

moving the plates in a direction longitudinally of the conveyor to a precise transverse machining position relative to the cutting tool;

clamping the plates at said precise height and in said transverse machining position;

driving the cutting tool to accurately machine the plates;

releasing the machined plates for support on said conveyor; and moving the machined plates off the conveyor.

2. A method according to claim 1 wherein the plate is vertical when being machined at said precision machining station.

3. A method according to claim 1 and additionally comprising the steps of:

moving the plates one at a time from a stack of horizontal plates onto said conveyor;

pivoting the plates to a vertical position;

after machining the plates at the precision machining station, pivoting the machined plates from a vertical position to a horizontal position; and restacking the horizontal machined plates one at a time.

4. A method according to claim 1 wherein the plates have longitudinal and transverse edges; and additionally comprising the steps of:

moving the plates longitudinally one at a time from a stack of horizontal plates onto said conveyor;

resiliently maintaining the longitudinal edges of the plates parallel to the direction of movement of the plates when supported by the conveyor;

edging the longitudinal edges of the plates as the plates are conveyed through a first edging station; and edging the transverse edges of the plates when the plates are held stationary by the conveyor at a second edging station.

5. A method according to claim 1 comprising the steps of:

moving the plates one at a time from a stack of horizontal plates onto the conveyor;

resiliently restraining the plates from lateral movement when in a first and second edging station;

edging the longitudinal edges of the plates as the plates are conveyed through an edging station;

edging the transverse edges of the plates when the plates are held stationary at the edging station;

pivoting the plates to a vertical position with one longitudinal edge supported by the conveyor;

after machining the plates at the precision machining station, pivoting the machined plates from a vertical to a horizontal position; and restacking the horizontal machined plates one at a time.

6. A method according to claim 1 and additionally comprising the steps of precisely detecting the thickness of each plate at an inspection station, and controlling the cutting tool to compensate for the plate thickness error from a specified plate thickness range.

7. A method according to claim 1 and additionally comprising the steps of precisely detecting the thickness of each plate at a plate thickness inspection station, and discharging a plate having a thickness outside of a specified thickness range by reversing the direction of movement of the conveyor.

8. A method according to claim 1 wherein said intermittently driven step is capable of controlling the movement and lack of movement of the plate at desired speeds at different locations along the conveyor.

9. A method according to claim 1 wherein the step of driving the cutting tool includes cutting out portions of the plates of different sizes, and selectively conveying selective sizes of cut-outs to different locations for selective collection as scrap metal.

10. A method according to claim 4 and additionally comprising the steps of precisely detecting the thickness of each plate at an inspection station prior to edging the plate, and controlling the cutting tool at the precision machining station to compensate for deviations from said specified plate thickness range.

11. A method according to claim 4 and additionally comprising the steps of precisely detecting the thickness of each plate at a plate thickness inspection station, and discharging a plate having a thickness outside of a specified thickness range by reversing the direction of movement of the conveyor.

12. A method according to claim 5 and additionally comprising the steps of:

supporting the stack of plates on a vertically movable plate unstacking mechanism;

pushing the uppermost plate off the stack and onto the conveyor;

indexing the stack upwardly an amount equal to the thickness of each plate; and repeating the pushing and indexing steps until all plates in the stack have been transferred onto the conveyor.

13. A method according to claim 12 and additionally comprising the steps of:

pulling each machine plate one at a time off the conveyor for support on a vertically movable plate stacking mechanism; and indexing the plate stacking mechanism downwardly a distance equal to the thickness of the plate after adding a plate to the stack being formed until a full stack is formed.

14. A method according to claim 13 and additionally comprising the steps of:

moving the stack of plates onto the plate unstacking mechanism by a fork lift truck when the unstacking mechanism is in its lowermost position; and removing a stack of machined plates from the plate stacking mechanism by a fork lift truck when a full stack has been made.

15. A method according to claim 1 and additionally comprising the steps of:

blowing chips formed by the cutting tool downwardly onto chip conveyors; and conveying the chips into a chip tub for collection and sale as scrap metal.

16. A method according to claim 15 wherein the step of driving the cutting tool includes cutting out portions of the plates of different sizes, and selectively coneying selective sizes of cut-outs to tubs different from said chip tub for selective collection based on size for use as scrap metal.

17. A plate routing method comprising the steps of:

moving a stack of plates having longitudinal and transverse edges onto an unstacking mechanism at a feed station;

intermittently pushing the uppermost plate off the stack onto a feed conveyor;

indexing the stack upwardly a distance equal to the thickness of a plate after each plate is pushed onto the feed conveyor until the stacking mechanism is empty;

cutting beveled edges on the longitudinal edges of the plate in response to moving the plates through a longitudinal edging station;

cutting beveled edges on the transverse edges of the plates when the plates are held stationary at a transverse edging station;

pivoting each edged plate from a horizontal to an upright position at a plate pivoting station;

machining each plate at a precision machining station with at least one cutting tool when each plate is clamped in a precise location relative to a precision machine tool;

pivoting each precision machined plate from an upright to a horizontal position;

moving the machined plates off the feed conveyor onto a stacking mechanism at a restacking station; and moving the stack downwardly a distance equal to the thickness of one plate after each plate is added to the stack and until a full stack is present on the stacking mechanism.

18. A method according to claim 17 and additionally comprising the steps of loading the stacks of plates onto the unstacking mechanism with a fork lift truck, and unloading a stack of machined plates from the stacking mechanism by a fork lift truck.

19. A method according to claim 17 and additionally comprising the steps of:

lifting the plate at the precision machining station off the feed conveyor for supporting the plate above the conveyor at a precise height relative to the cutting tool;

moving the plate at the precision machining station in a direction longitudinally of the conveyor to a precise transverse machining position relative to the cutting tool;

clamping the plate at a precise height and in said transverse machining position when at the precision machining station;

driving the cutting tool to accurately machine the plate; and releasing the machined plate onto the feed conveyor.

20. A method according to claim 17 wherein the plates are in an upright position when supported on the conveyor and when being machined at the precision machining station.

21. A method according to claim 17 including the steps of precisely detecting the thickness of each plate at an inspection station, and controlling a precision machine tool at said machining station to compensate for the plate thickness error from a specified plate thickness range prior to machining the plate.

22. A method according to claim 17 wherein said intermittently driven step is capable of controlling the movement and lack of movement of the plates at desired speeds at different locations along the conveyor.

23. A method according to claim 17 wherein the step of machining each plate at the precision machine station includes cutting out portions of the plates of different sizes, and selectively conveying the different sized cutouts to different locations for selective collection in different tubs according to the size of the cut-outs.

24. A plate routing method comprising the steps of:

moving a spaced upright plate supported in a plate storage carrier into a plate transfer position;

transferring an upright plate onto a feed conveyor while retaining the plate in an upright position;

moving the upright plate into alignment with an intermittently driven conveyor disposed normal to the feed conveyor;

transferring the upright plate from the feed conveyor onto the intermittently driven conveyor for movement into a precision machining station;

extending a plurality of vertically spaced pins into the path of the upright plate on the intermittently driven conveyor for stopping the plate in a precise longitudinal position to be machined;

projecting a plurality of pointed horizontally spaced pins under the plate when in the machining station for raising the plate a short distance off the intermittently driven conveyor to the precise height to be machined;

clamping the plate in turn in said precise position to be machined;

machining the plate;

unclamping the plate;

retracting said vertically and horizontally spaced pins from the path of movement of the plate;

moving the machined upright plate onto a discharge conveyor while retaining the plate spaced apart and in an upright position;

moving the machined upright plate into alignment with an empty plate storage carrier; and transferring the machined upright plate off the discharge conveyor and into an empty plate storage carrier.

25. A method according to claim 24 wherein the intermittently driven conveyor is a roller conveyor.

26. A method according to claim 24 wherein said plate storage carriers are fork lift carriers.

27. A plate routing method comprising the steps of:

moving a plurality of spaced upright plates supported in a plate storage carrier into a plate transfer position;

simultaneously transferring the plurality of upright plates onto a feed conveyor while retaining the plates spaced apart and in upright position;

moving the upright plates one at a time into alignment with an intermittently driven conveyor disposed normal to the feed conveyor;

transferring the upright plates one at a time from the feed conveyor onto the intermittently driven conveyor for movement into a precision machining station;

extending a plurality of vertically spaced pins into the path of each upright plate on the intermittently driven conveyor for stopping the plates in turn in precise longitudinal position to be machined;

projecting a plurality of pointed horizontally spaced pins under each upright plate when in the machining station for raising the plate a short distance off the intermittently driven conveyor to the precise height to be machined;

clamping each plate in turn in said precise position to be machined;

machining each plate in turn;

unclamping each plate in turn;

retracting said vertically and horizontally spaced pins from the path of movement of the plates;

moving each machined upright plate in turn onto a discharge conveyor while retaining the plates spaced apart and in an upright position;

moving a plurality of the machined upright plates into alignment with an empty plate storage carrier; and simultaneously transferring a plurality of machined upright plates off the discharge conveyor and into an empty plate storage carrier.

28. A plate routing apparatus comprising:

intermittently driven conveyor means having a plate supporting surface for moving plates having longitudinal and transverse edges along a predetermined path;

precision plate working means at a function performing station adjacent said path for performing a precise function on said plate when said conveyor means is stationary;

lifting means at said function performing station for raising the plate at said function performing station off said conveyor means;

precision support means at said function performing station movable into and out of plate supporting position for maintaining the plate at a precise elevation relative to said plate working means;

precision edge locating means movable into and out of edge locating position for precisely locating one transverse edge of the plate at the function performing station relative to said plate working means;

clamping means for rigidly clamping the plate in precise position to be worked; and means for repositioning the plate after being worked by the precision plate working means on said conveying means for subsequent discharge from said conveying means.

29. An apparatus according to claim 28 wherein said intermittently driven conveyor is a roller conveyor.

30. An apparatus according to claim 28 wherein said precision working means is a precision machining mechanism having at least one machine working tool thereon.

31. An apparatus according to claim 28 wherein said precision supporting means comprises a plurality of horizontal pins disposed in position to support the plate at the function performing station when the pins are moved into plate supporting position.

32. An apparatus according to claim 28 wherein said precision edge locating means includes a plurality of vertically spaced retractable pins movable into and out of position to engage one transverse edge of the plate at the function performing station.

33. An apparatus according to claim 29 wherein said lifting means comprises fluid ram means, a piston rod in said ram, and a fork on said piston rod, said ram when extended moving portions of said fork between the rollers of said conveyor for contacting and lifting the plate off said conveyor and above said precision support means; the worked plate being lowered onto said conveyor upon moving said precision support means out of said plate supporting position and lowering said forks below a plate supporting surface of said conveyor means.

34. An apparatus according to claim 28 wherein said precision supporting means includes a plurality of pointed pins movable into and out of their plate supporting position and having their upper surfaces positioned slightly above the level of a plate supporting surface of a conveyor, said points of said pins when being extended under the plate lifting the plate above said plate supporting surface of said conveying means.

35. A plate routing apparatus comprising:

intermittently driven roller conveyor means having wide inlet and discharge portions and a narrow intermediate portion;

unstacking means for supporting a stack of plates to be processed and for intermittently raising the stack in increments equal to the thickness of each plate, said plates having longitudinal and transverse edges;

power means for pushing the uppermost plate off said stacking means onto said wide inlet portion of said roller conveyor means;

longitudinal edging means for edging the longitudinal edges of each plate as the plate is advanced between said edging means by the conveyor means;

transverse edging means including means moving said edging means transversely of said conveyor means for edging the transverse edges of each plate when the plate is maintained stationary on said intermittently driven conveyor means;

first plate pivoting means for pivoting each edged plate from a horizontal to a vertical position when said conveying means is stationary;

precision machinery means disposed on one side of said narrow intermediate portion of said conveyor means and having at least one plate engagable tool thereon;

plate locating and clamping means opposing said precision machinery means on the opposite side of said narrow portion of said conveyor for elevating each plate of said conveying means and rigidly securing each plate in a precise position for being machined by said at least one tool, and after being machined, releasing and lowering the machined plate upon said conveyor means for movement out of said narrow portion and into said discharge portion of said conveying means;

second plate pivoting means for pivoting each machined plate from a vertical to a horizontal position when said conveying means is stationary;

stacking means for receiving machined plates from said conveying means and for intermittently lowering the stack in increments equal to the thickness of each plate; and power means for assisting said conveyor means for pulling the machined plates onto said stacking means.

36. An apparatus according to claim 35 wherein a fork lift truck places stacks of plates on said unstacking means and removes stacks of machined plates from said stacking means.

37. An apparatus according to claim 35 and additionally comprising chip conveying means below said narrow portion of said conveyor for collecting chips removed from said plates, and container means for receiving the chips from said conveyor means.

38. An apparatus according to claim 35 and additionally comprising thickness detecting means for precisely detecting the thickness of each plate at a thickness inspection station upstream of said precision machinery means and being responsive to control said at least one plate engagable tool to compensate for plate thickness errors which deviate from a specified plate thickness range.

39. An apparatus according to claim 35 and additionally comprising thickness detecting means for precisely detecting the thickness of each plate at a plate thickness inspection station, said thickness detecting means being responsive to control said conveyor means to discharge a defective plate having a thickness outside of a specified thickness range by reversing the direction of movement of at least a portion of said conveyor means for discharging the defective plate out of said wide inlet.

40. An apparatus according to claim 35 wherein said intermittently driven conveyor means controls the movement or lack of movement of the plates at desired speeds at different locations on the conveyor.

41. Am apparatus according to claim 35 wherein said at least one plate engaging tool cuts out portions of the plates at different sizes, and means for selectively conveying different sizes of cut-outs to different locations for collection.

42. A plate routing apparatus comprising:
an intermittently driven roller conveyor for supporting and guiding upright oriented plates thereon from a feed end to a discharge end;
a plate processing mechanism disposed intermediate of said roller conveyor for performing work on plates when aligned therewith;
a first plate supporting means having at least a pair of upright plate guides thereon and having an upright plate therebetween in alignment with said roller conveyor;
a first plate transfer means for transferring the plate in said first plate supporting means onto a feed end of said roller conveyor for movement into said plate processing mechanism to be processed;
second plate supporting means having at least a pair of upright plate guides thereon adapted to receive a processed plate therebetween; and
second plate transfer means for transferring the processed plate when in an upright position into said second plate supporting means for movement out of alignment with said narrow roller conveyor.

43. An apparatus according to claim 42 wherein said first plate supporting means is a feed conveyor disposed in alignment with the feed end of said roller conveyor, and wherein said second plate supporting means is a discharge conveyor disposed in alignment with the discharge end of said roller conveyor.

44. A plate routing apparatus comprising:
a driven feed conveyor having a plurality of evenly spaced plate separators thereon;
a driven discharge conveyor having a plurality of evenly spaced plate separators thereon;
a narrow roller conveyor having a plurality of short horizontal intermittently driven plate supporting rollers thereon and a plurality of tall idler rollers for guiding vertically oriented plates thereon;
a plate processing mechanism disposed intermediate said roller conveyor for performing work on plates aligned therewith;
a plurality of plate storage carriers each having a plurality of spaced upright plate guides thereon; one of said carriers having a plurality of upright plates to be processed therein disposed in plate transfer position adjacent one side of said feed conveyor with the plate guides in said one storage carrier being in planar alignment with corresponding plate guides on the upper surface of the feed conveyor;
first plate transfer means for transferring a plate in said one storage carrier into an empty space on said feed conveyor between said spaced separators thereon;
second plate transfer means for transferring a single plate from said feed conveyor onto said narrow roller conveyor for movement into position to be processed by said plate processing mechanism;
means for pulling the processed plate fully off said roller conveyor and onto said discharge conveyor; and
second plate transfer means for transferring the processed plate out of said discharge conveyor into another one of said empty storage carriers.

45. An apparatus according to claim 44 wherein said plate processing mechanism performs a cutting operation on each plate.

46. A plate routing apparatus comprising:
a driven feed conveyor having a plurality of short evenly spaced plate separators thereon;
a driven discharge conveyor having a plurality of evenly spaced plate separators thereon;
a narrow roller conveyor having a plurality of short horizontal intermittently driven plate supporting rollers thereon and a plurality of tall idler rollers for guiding vertically oriented plates thereon;
a plate processing mechanism disposed intermediate said roller conveyor for performing work on plates aligned therewith;
a plurality of plate storage carriers each having a plurality of spaced upright plate guides thereon, a first storage carrier filled with upright plates into a plate being movable in transfer position adjacent one side of said feed conveyor with the plate guides in said first storage carrier being in planar alignment with corresponding plate guides on the upper surface of the feed conveyor;
first multiple plate transfer means for simultaneously transferring all plates in said first storage carrier into empty spaces on said feed conveyor between said spaced separators thereon;
single plate transfer means for transferring a single plate from said feed conveyor onto said narrow roller conveyor for intermittent movement into position to be processed;
means for pulling each processed plate fully off said roller conveyor and sequentially onto said discharge conveyor; and
second multiple plate transfer means for simultaneously transferring a plurality of processed plates out of said discharge conveyor onto one of said empty storage conveyors.

47. An apparatus according to claim 46 wherein said plate processing mechanism performs a cutting operation on each plate.

48. An apparatus according to claim 46 wherein said first multiple plate transfer means comprises a fork having multiple prongs equal in number to the number of spaces between plate separators on the associated plate storage carrier; and ram means for reciprocating said prongs between said plate separators to move said plates therein onto said feed conveyor.

49. An apparatus according to claim 46 wherein said second multiple plate transfer means comprises a fork having multiple prongs equal in number to the number of spaces between plate separators on the associated plate storage carrier, and ram means for reciprocating said prongs between said plate separators on said discharge conveyor for moving the processed plates onto said discharge conveyor.

50. An apparatus according to claim 46 wherein said driven feed conveyor and said driven discharge conveyor are intermittently driven.

* * * * *